(12) United States Patent
Campbell

(10) Patent No.: US 8,300,945 B2
(45) Date of Patent: Oct. 30, 2012

(54) METHODS AND SYSTEMS FOR CONNECTED-COMPONENT LABELING

(75) Inventor: Richard John Campbell, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1128 days.

(21) Appl. No.: 12/181,198

(22) Filed: Jul. 28, 2008

(65) Prior Publication Data

US 2010/0021061 A1    Jan. 28, 2010

(51) Int. Cl.
*G06K 9/34* (2006.01)
(52) U.S. Cl. .................. 382/195; 382/175; 382/180
(58) Field of Classification Search .................. None
See application file for complete search history.

(56) References Cited

U.S. PATENT DOCUMENTS

| | | | |
|---|---|---|---|
| 4,991,224 A | 2/1991 | Takahashi et al. | |
| 5,761,344 A | 6/1998 | Al-Hussein | |
| 5,818,978 A | 10/1998 | Al-Hussein | |
| 5,841,903 A | 11/1998 | Kikuchi | |
| 6,731,801 B2 | 5/2004 | Murakawa et al. | |
| 6,763,137 B1 | 7/2004 | Krtolica | |
| 2002/0126898 A1* | 9/2002 | Guo | 382/199 |
| 2003/0156757 A1 | 8/2003 | Murakawa et al. | |
| 2004/0042659 A1* | 3/2004 | Guo et al. | 382/176 |
| 2006/0034194 A1 | 2/2006 | Kahan | |

FOREIGN PATENT DOCUMENTS

| | | |
|---|---|---|
| JP | 63020578 A | 1/1988 |
| JP | 08-111782 A | 4/1996 |
| JP | 2003150966 A | 5/2003 |
| WO | 2006/083236 A1 | 8/2006 |

OTHER PUBLICATIONS

Francis K.H. Quek, An algorithm for the rapid computation of boundaries of run-length encoded regions, Pattern Recognition, vol. 33, Issue 10, Oct. 2000, pp. 1637-1649, ISSN 0031-3203, 10.1016/S0031-3203(98)00118-6. (http://www.sciencedirect.com/science/article/pii/S0031320398001186) Keywords: Run-length encoding; Regions; Region boundary; F.*

Lifeng He; Yuyan Chao; Suzuki, K.; , "A Run-Based Two-Scan Labeling Algorithm," Image Processing, IEEE Transactions on , vol. 17, No. 5, pp. 749-756, May 2008 doi: 10.1109/TIP.2008.919369 URL: http://ieeexplore.ieee.org/stamp/stamp.jsp?tp=&arnumber=4472694&isnumber=4484077.*

Appiah, K.; Hunter, A.; Dickinson, P.; Owens, J.; , "A run-length based connected component algorithm for FPGA implementation," ICECE Technology, 2008. FPT 2008. International Conference on , vol., no., pp. 177-184, Dec. 8-10, 2008 doi: 10.1109/FPT.2008.4762381 URL: http://ieeexplore.ieee.org/stamp/stamp.jsp?tp=&arnumber=4762381&isnumber=4762340.*

He, Lifeng. "A run-based two-scan labeling algorithm", ICIAR 2007, LNCS 4633, pp. 131-142, 2007.*

(Continued)

*Primary Examiner* — Jason M Repko
*Assistant Examiner* — Thomas A James
(74) *Attorney, Agent, or Firm* — Kristine Elizabeth Matthews; David C. Ripma

(57) ABSTRACT

Aspects of the present invention are related to systems and methods for connected-component labeling.

23 Claims, 22 Drawing Sheets

OTHER PUBLICATIONS

Shima, Y.; Murakami, T.; Koga, M.; Yashiro, H.; Fujisawa, H.;, "A high-speed algorith for propagation-type labeling based on block sorting of runs in binary images," Pattern Recognition, 1990. Proceedings., 10th International Conference on , vol. i, no., pp. 655-658 vol. 1, Jun. 16-21, 1990 doi: 10.1109/ICPR.1990.118183.*

James Bruce, Tucker Balch, Manuela Veloso, "Fast and Inexpensive Color Image Segmentation for Interactive Robots," In Proceedings of IROS-2000, Oct. 2000, pp. 2061-2066, IEEE, Japan.

Japanese Office Action—Decision to Grant Patent—Patent Application No. 2009/174620—Mailing Date Mar. 1, 2011.

* cited by examiner

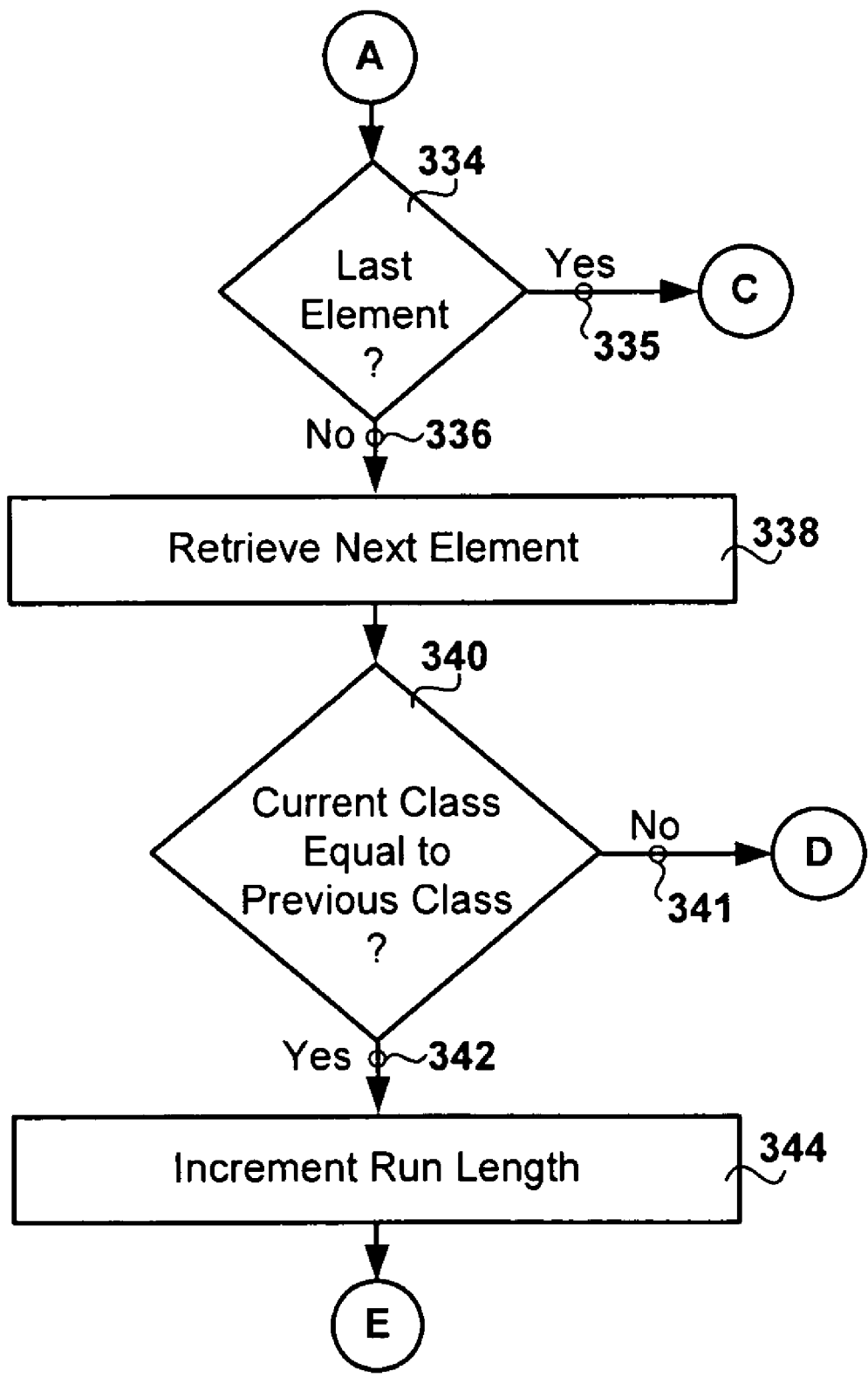
FIG. 18 - Continued

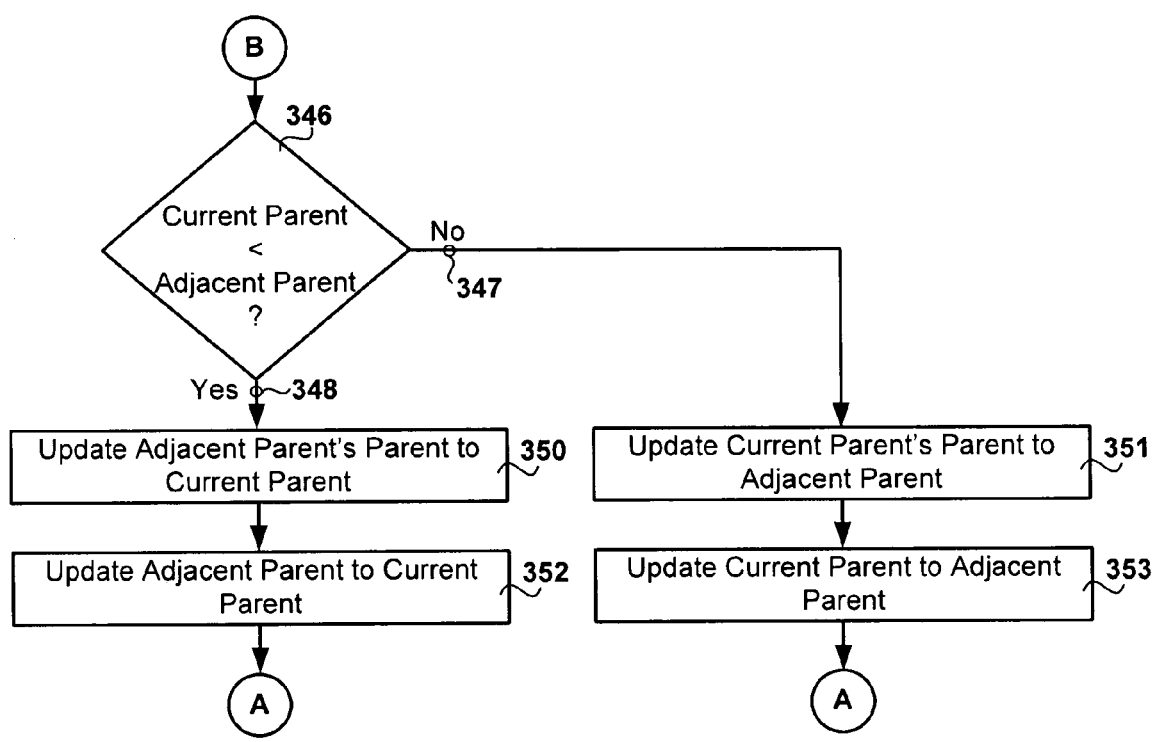
FIG. 18 - Continued

METHODS AND SYSTEMS FOR CONNECTED-COMPONENT LABELING

FIELD OF THE INVENTION

Embodiments of the present invention relate to the field of image analysis, and more particularly, to connected-component detection and labeling.

BACKGROUND

In some applications, it may be useful to connect similarly labeled elements into regions based on contiguity. An individual region may then be studied, processed, analyzed or otherwise treated as a connected unit in order to determine region properties, to identify the object class to which the region belongs or to apply a specific process to the region's elements. An exemplary process may comprise the application of a region-specific filter to all the elements in a region.

The process of connecting elements into regions may be referred to as connected-component labeling, and such algorithms may be cited in the image-processing literature as connected-component algorithms. Methods and systems for computing connected regions efficiently may be desirable.

SUMMARY

Some embodiments of the present invention comprise methods and systems for connected-component labeling, wherein a fixed-size memory buffer may be used to store associated data structures. Some embodiments of the present invention comprise methods and systems for connected-component labeling with a predetermined, maximum execution path.

Some embodiments of the present invention comprise a first data pass which combines run-length encoding (RLE) of a class map and linking of neighboring runs that have similar classes. A second data pass compresses the paths identified in the first pass to the upper-most run, and the component labels may then be determined.

In some embodiments of the present invention, data structures associated with the data runs may be initialized with values that may reconstruct a valid label image even when the number-of-runs limit is exceeded by the RLE process. In these embodiments, a run data structure and a starting-run data structure may be pre-allocated with default values.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 6:
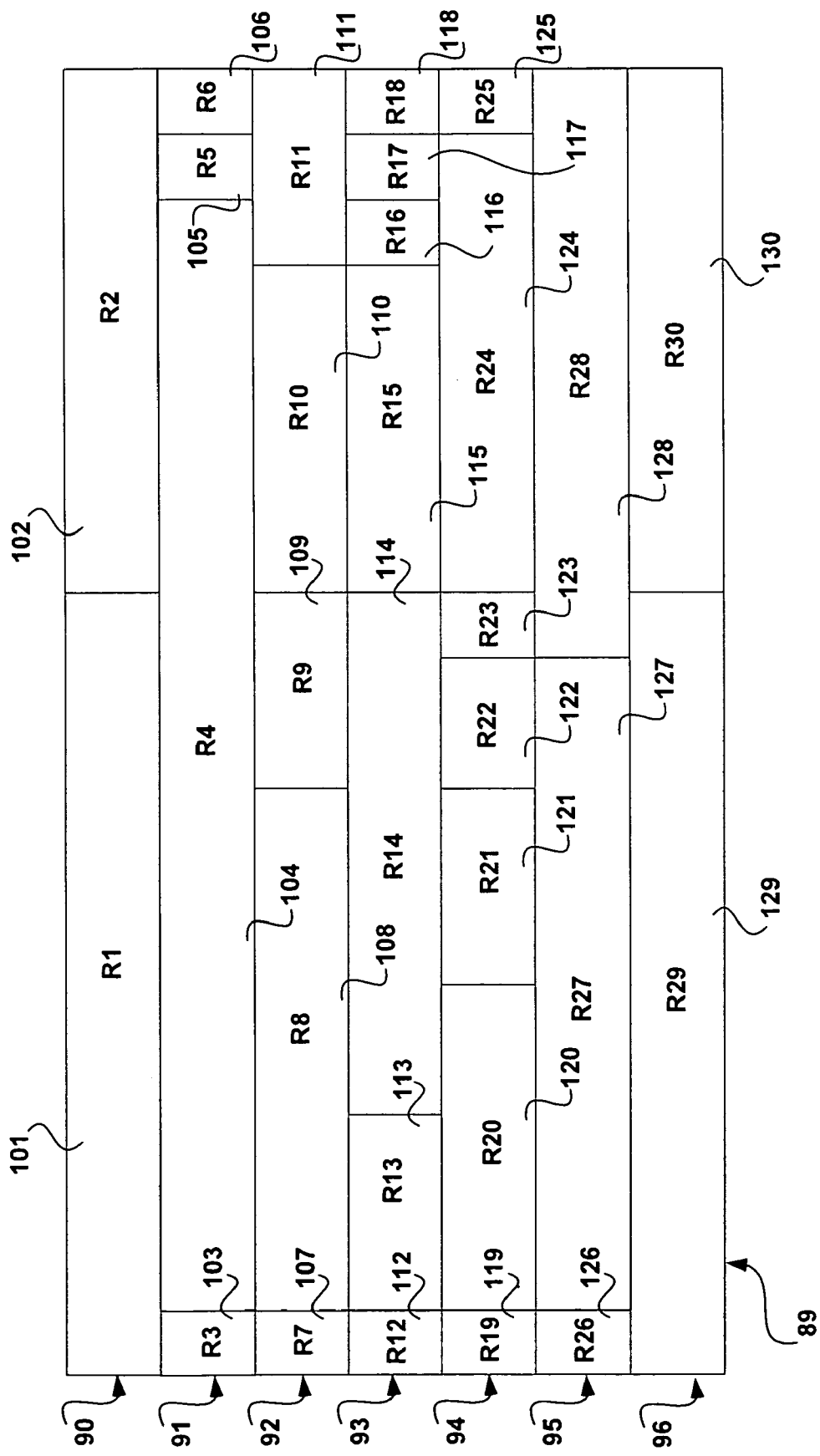
FIG. 6 is a picture depicting an exemplary class map relative to which exemplary embodiments of the present invention may be described.
Figure 8A:
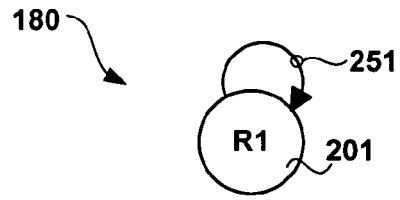
Figure 8B:
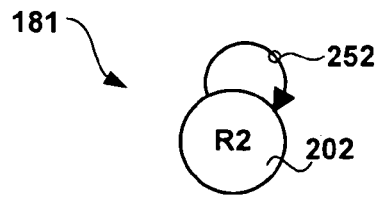
Figure 9A:
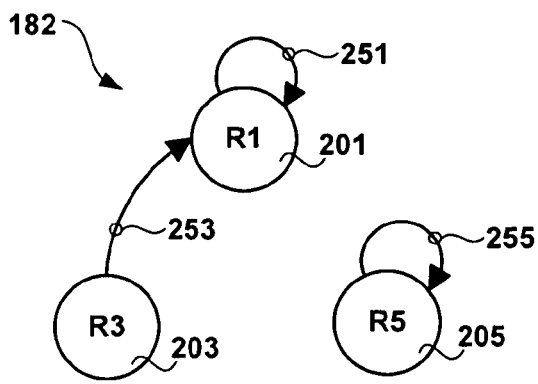
Figure 9B:
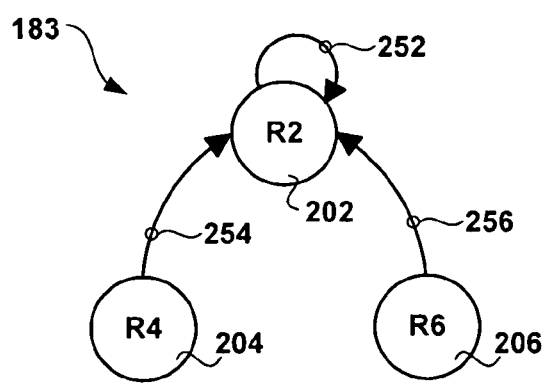
Figure 10A:
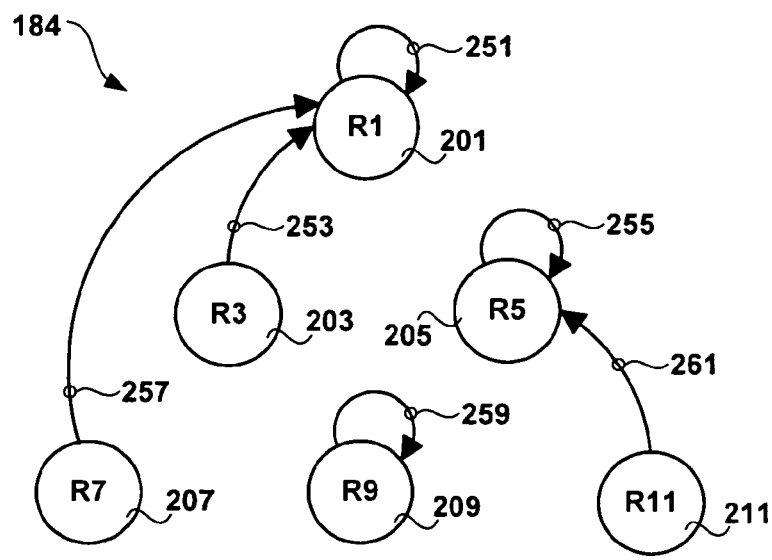
Figure 10B:
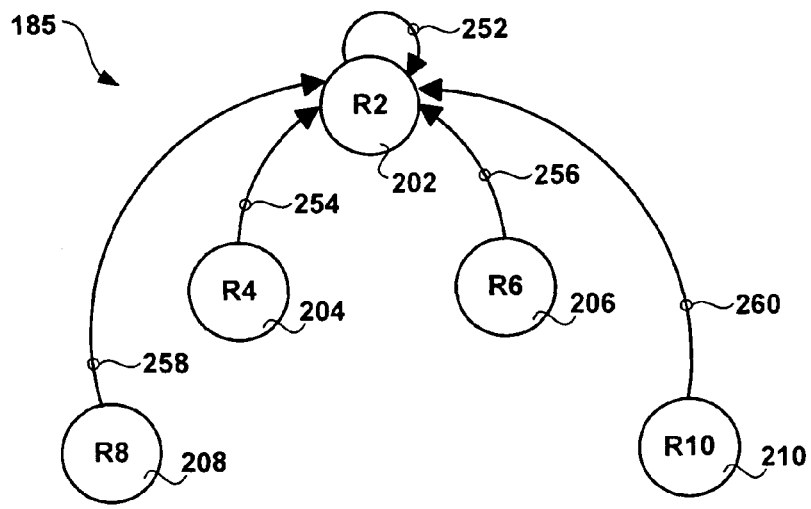
Figure 11A:
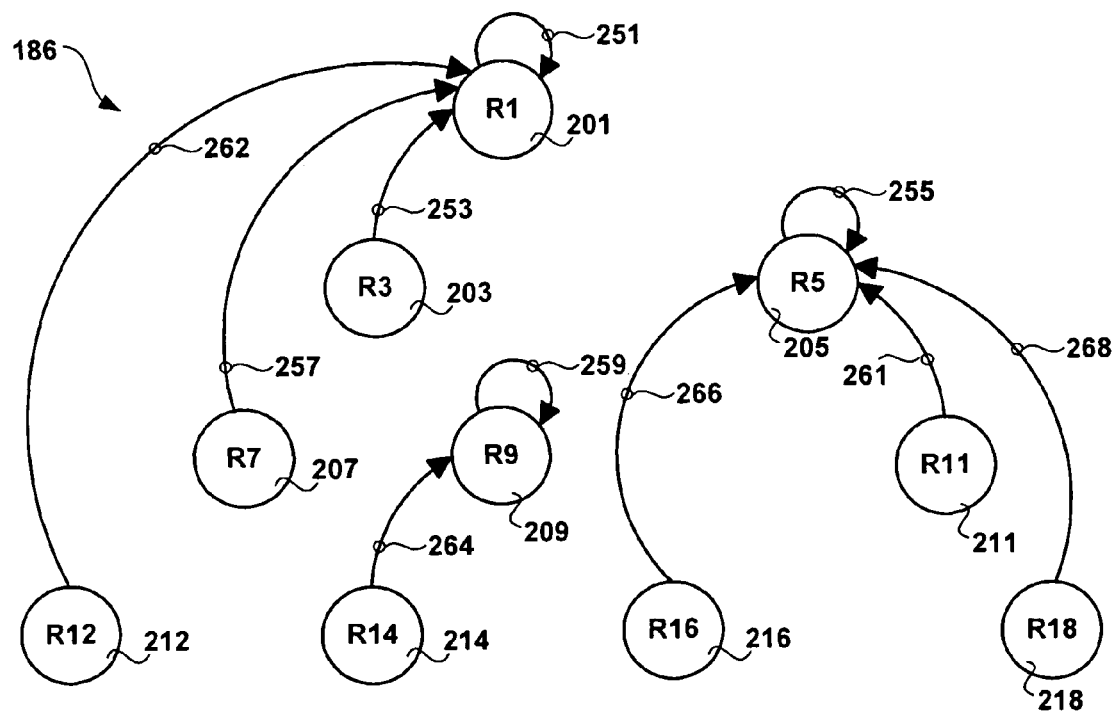
Figure 11B:
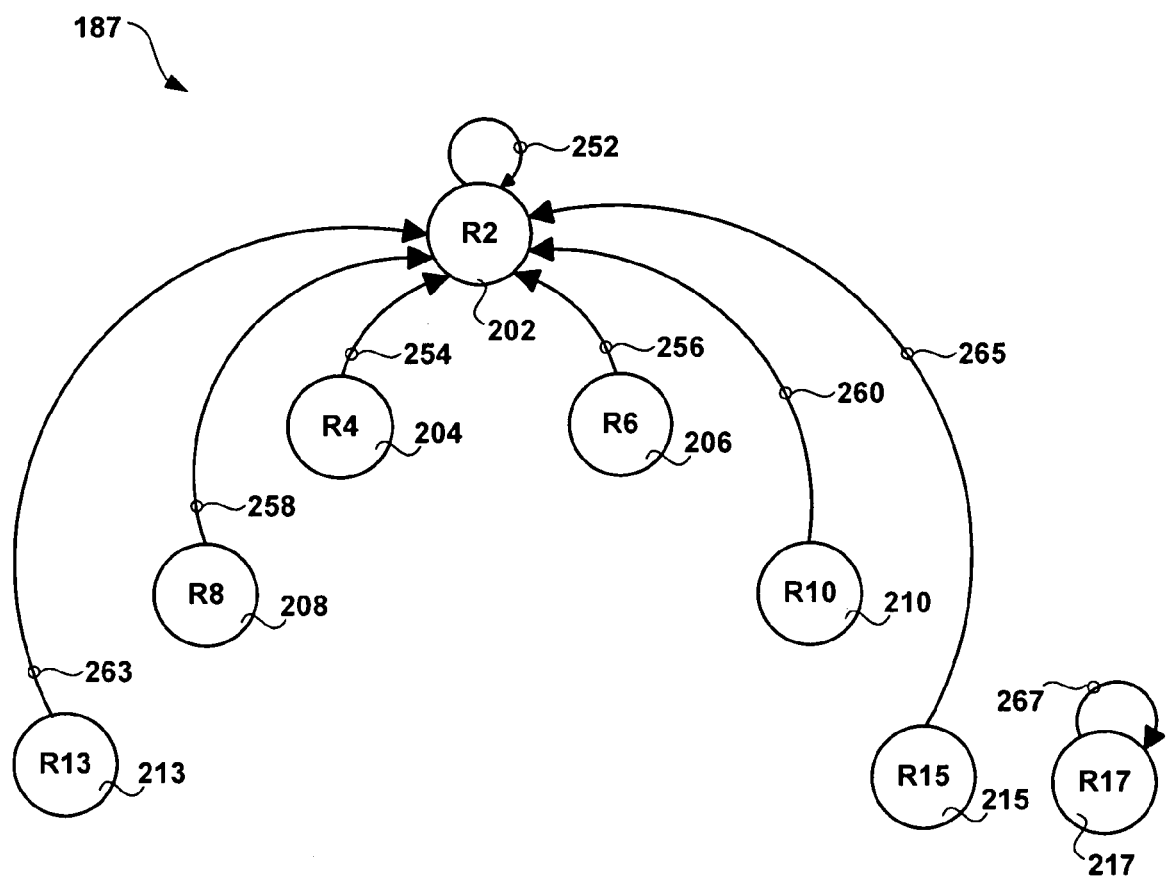
Figure 12A:
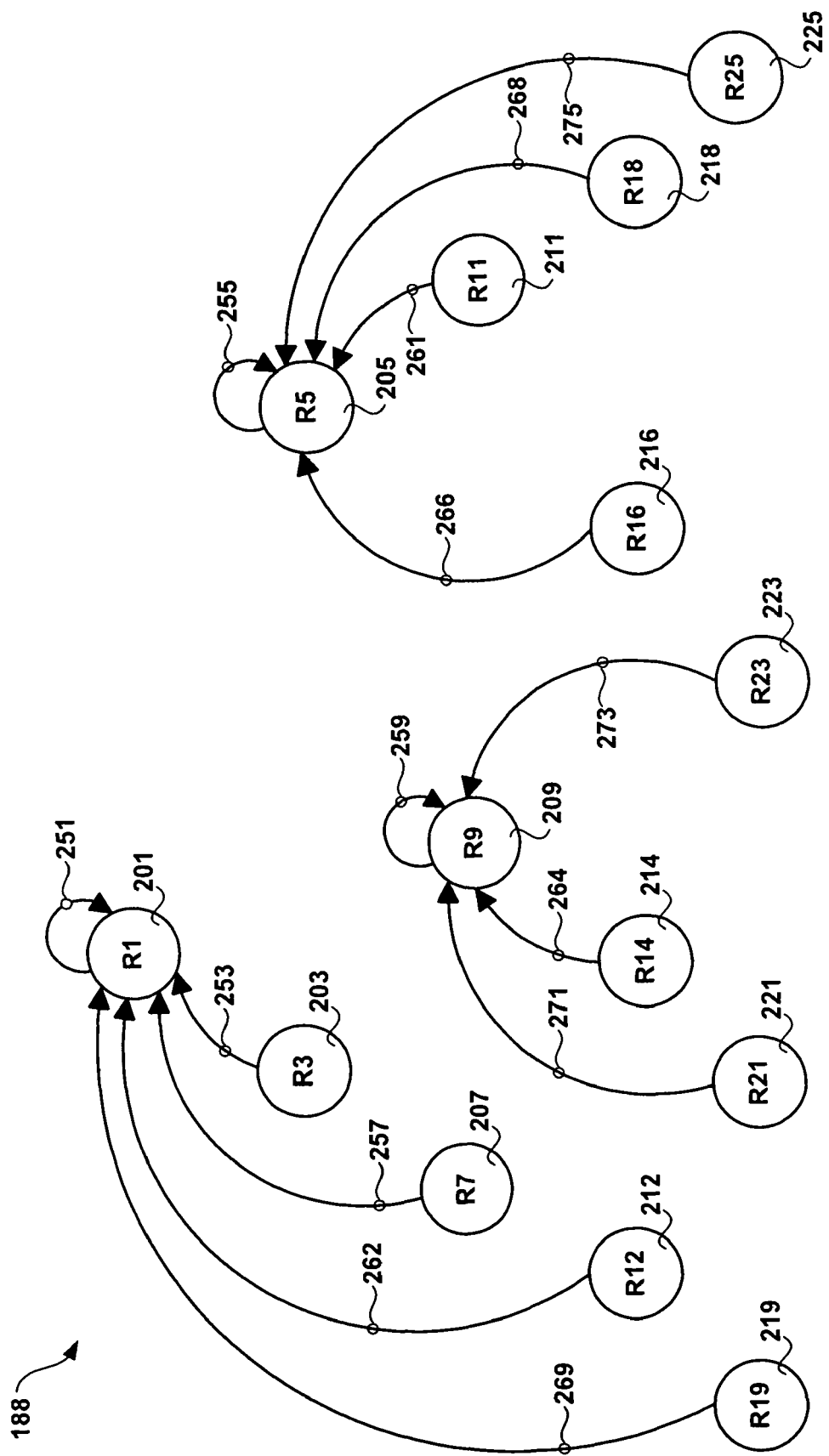
Figure 12B:
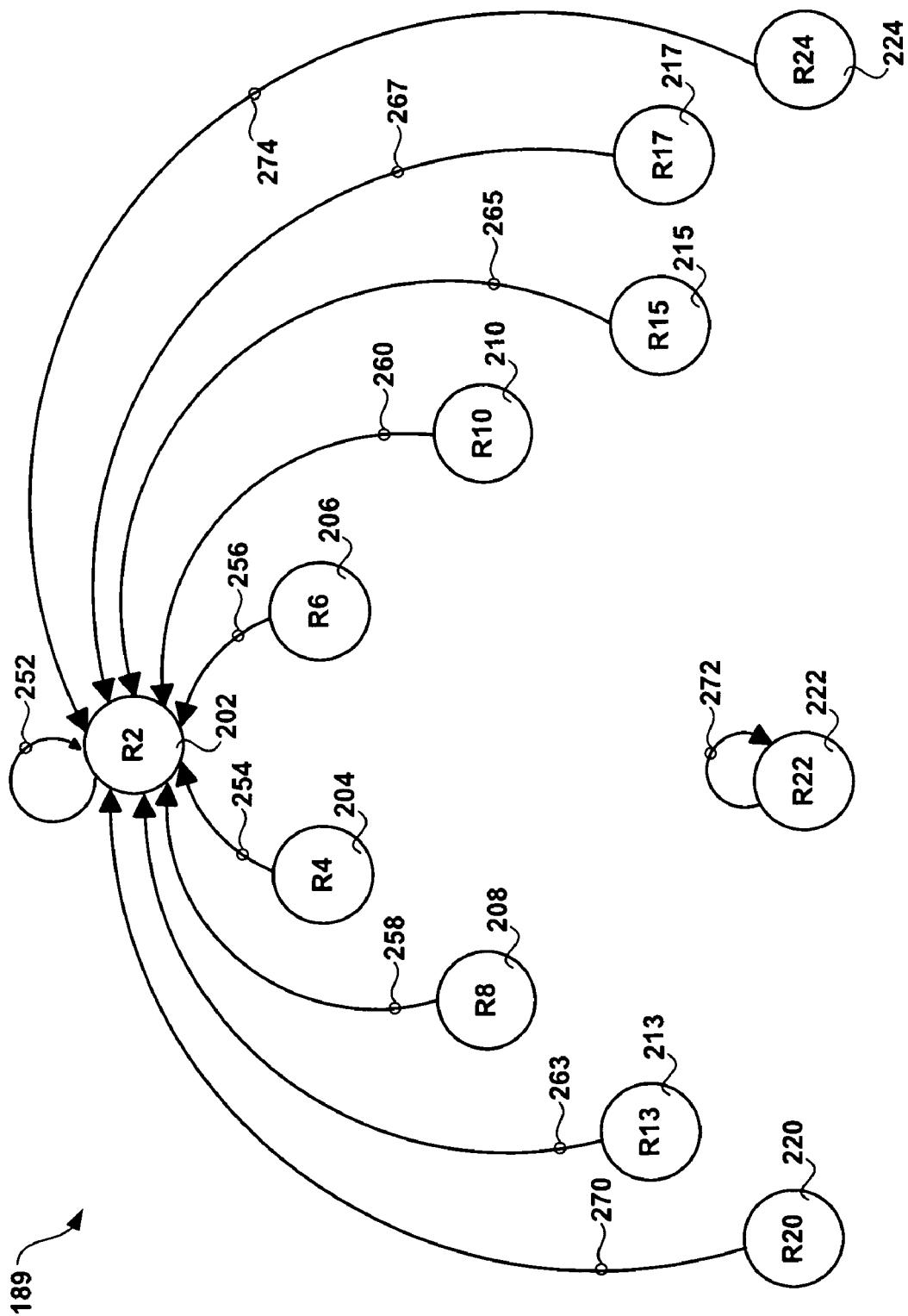
Figure 13A:
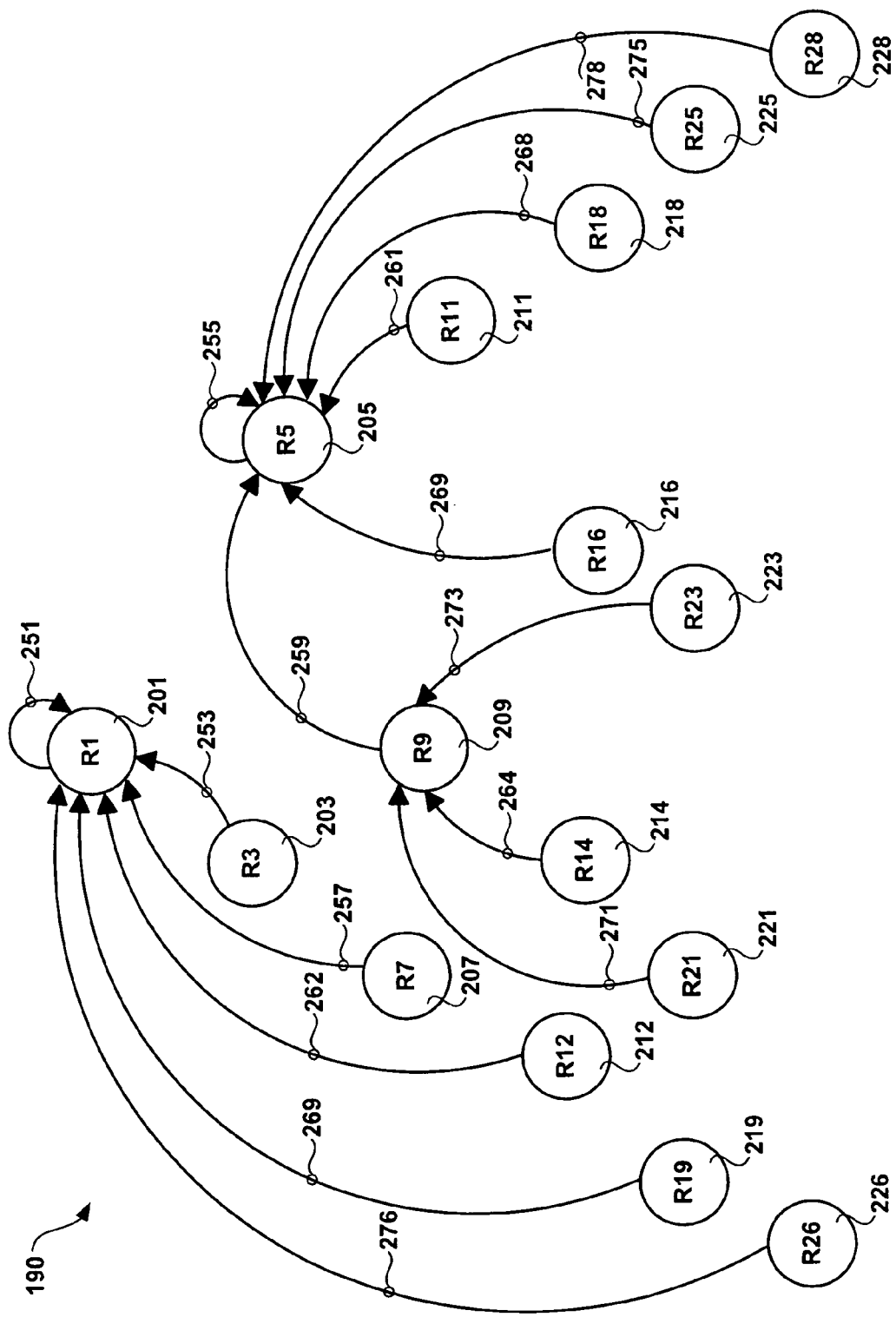
Figure 13B:
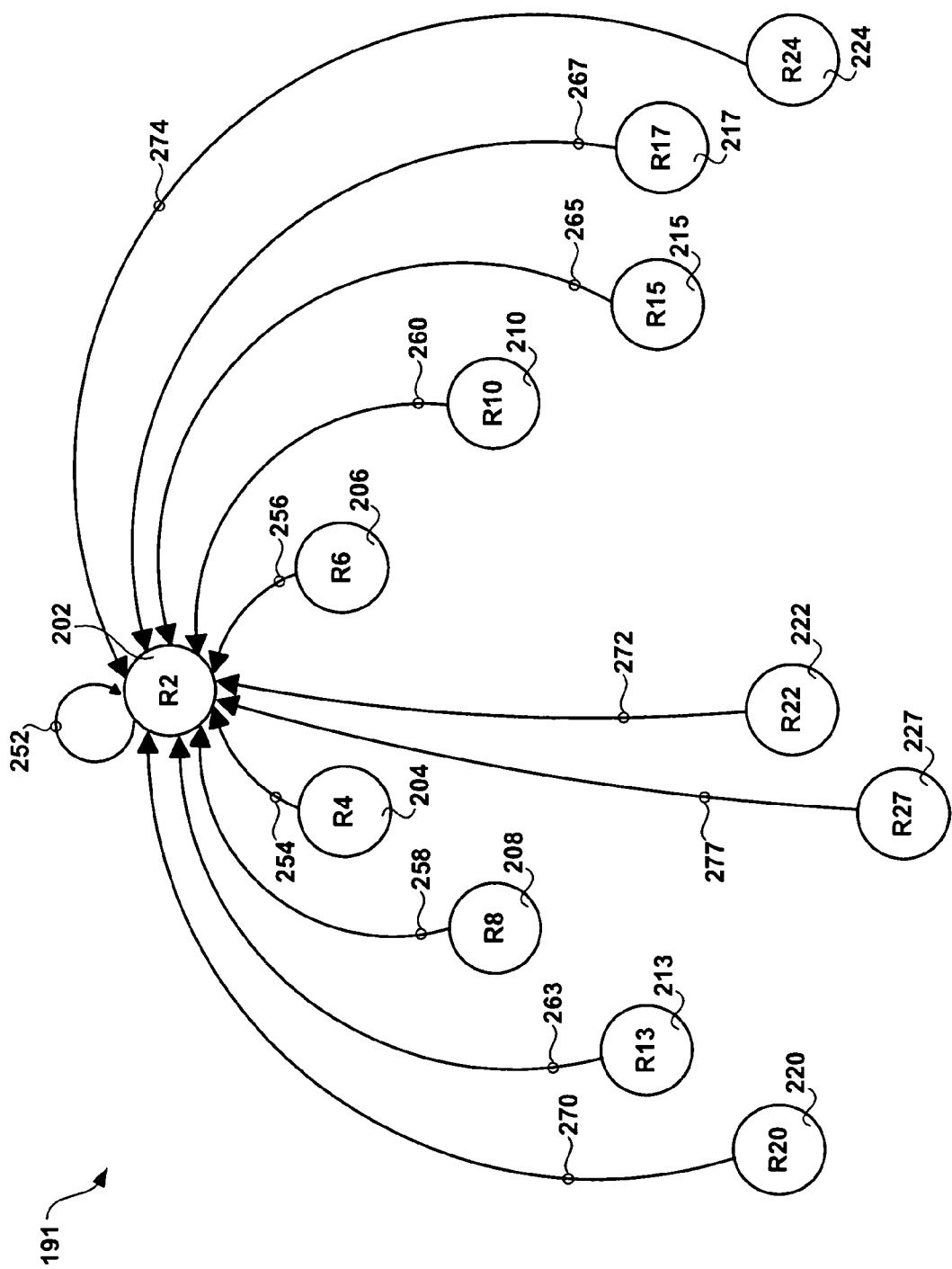
Figure 14A:
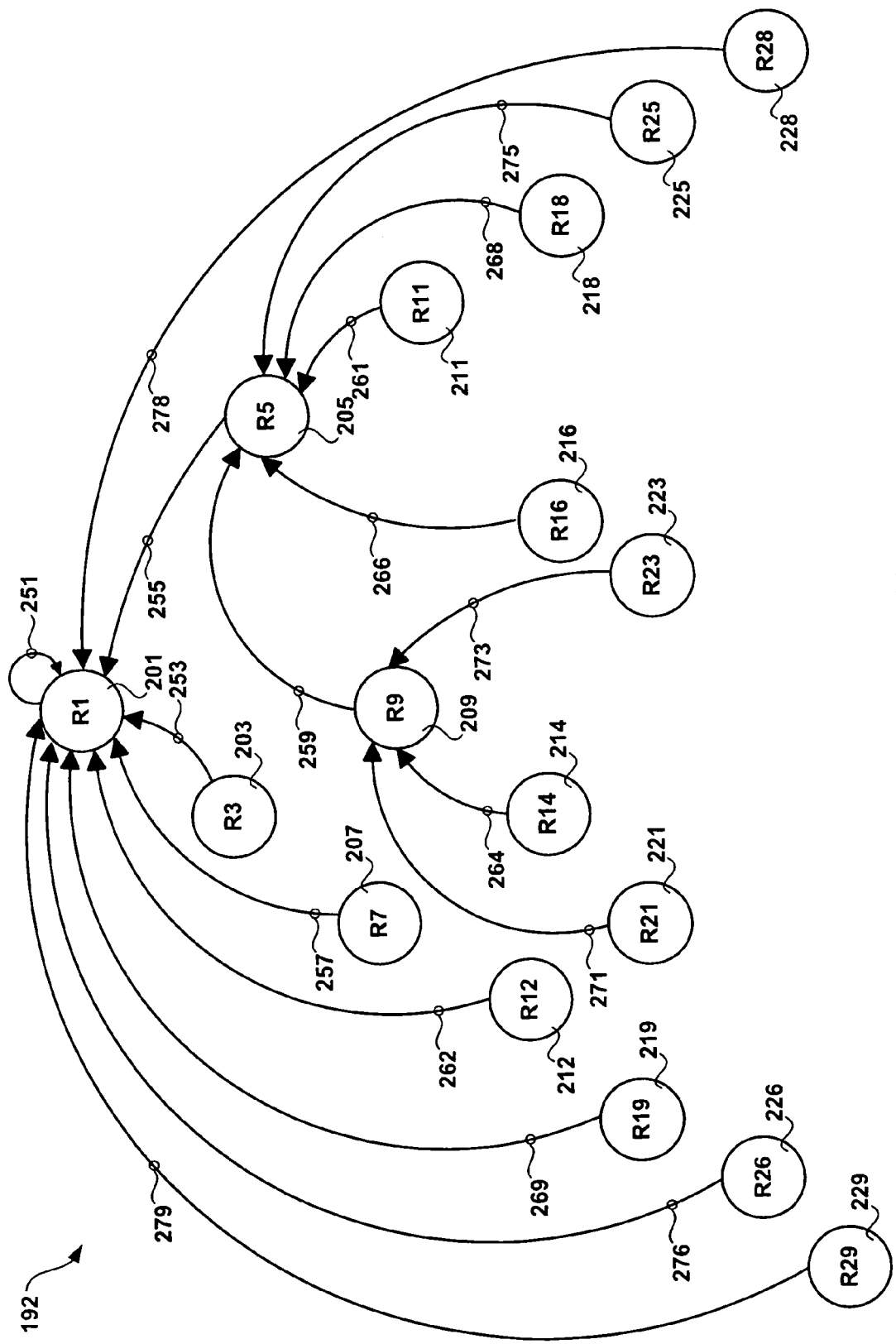
Figure 14B:
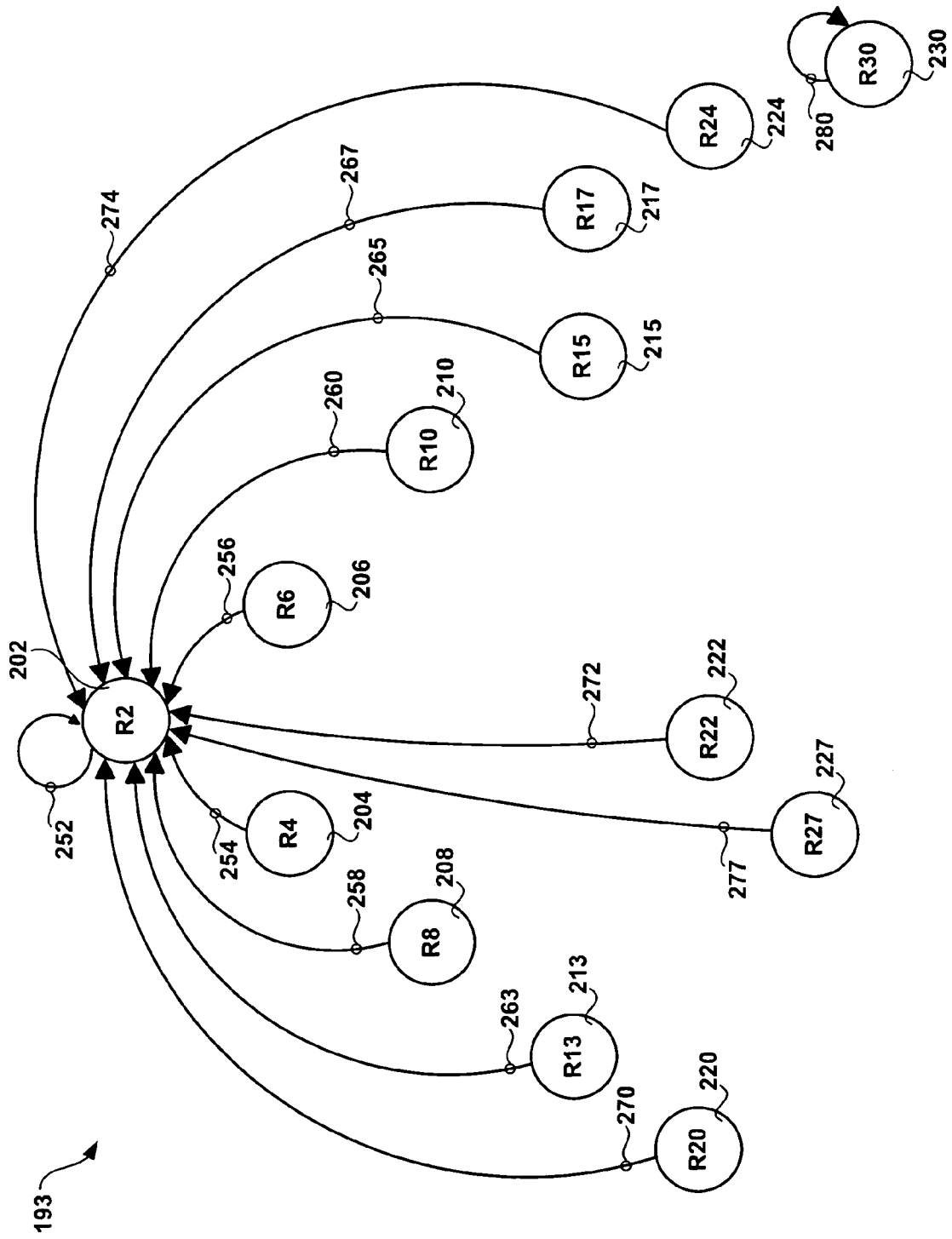
Figure 15:
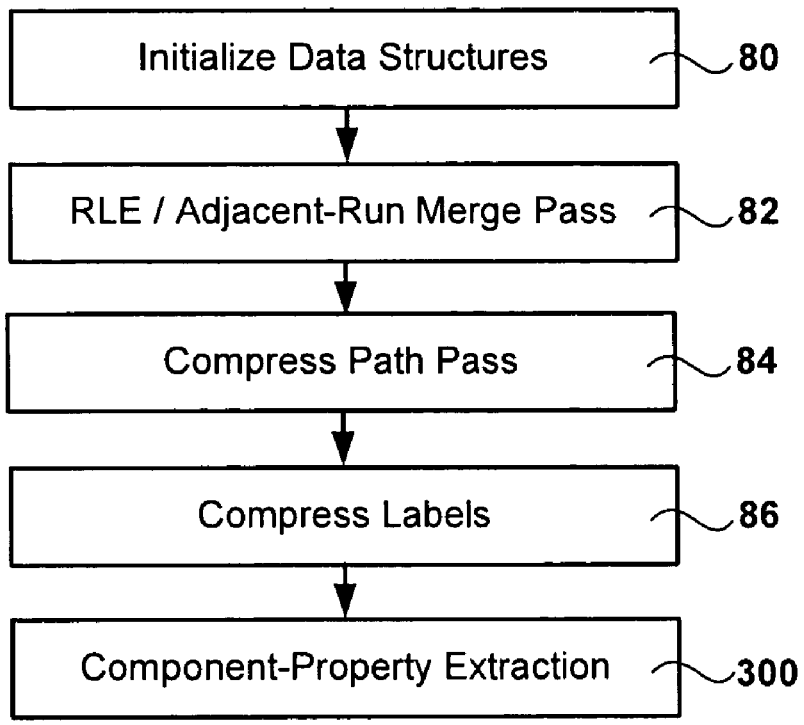
Figure 16:
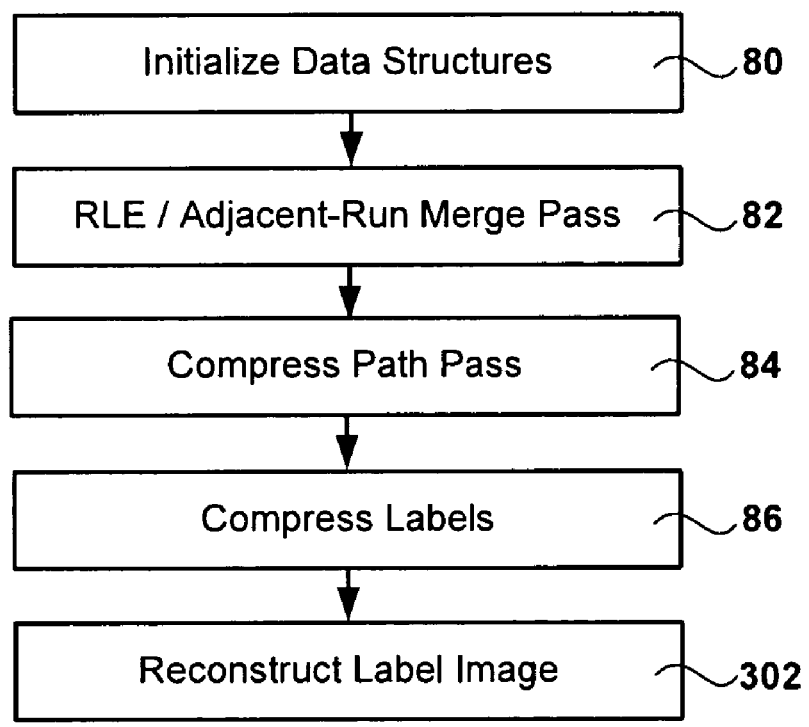
Figure 17:
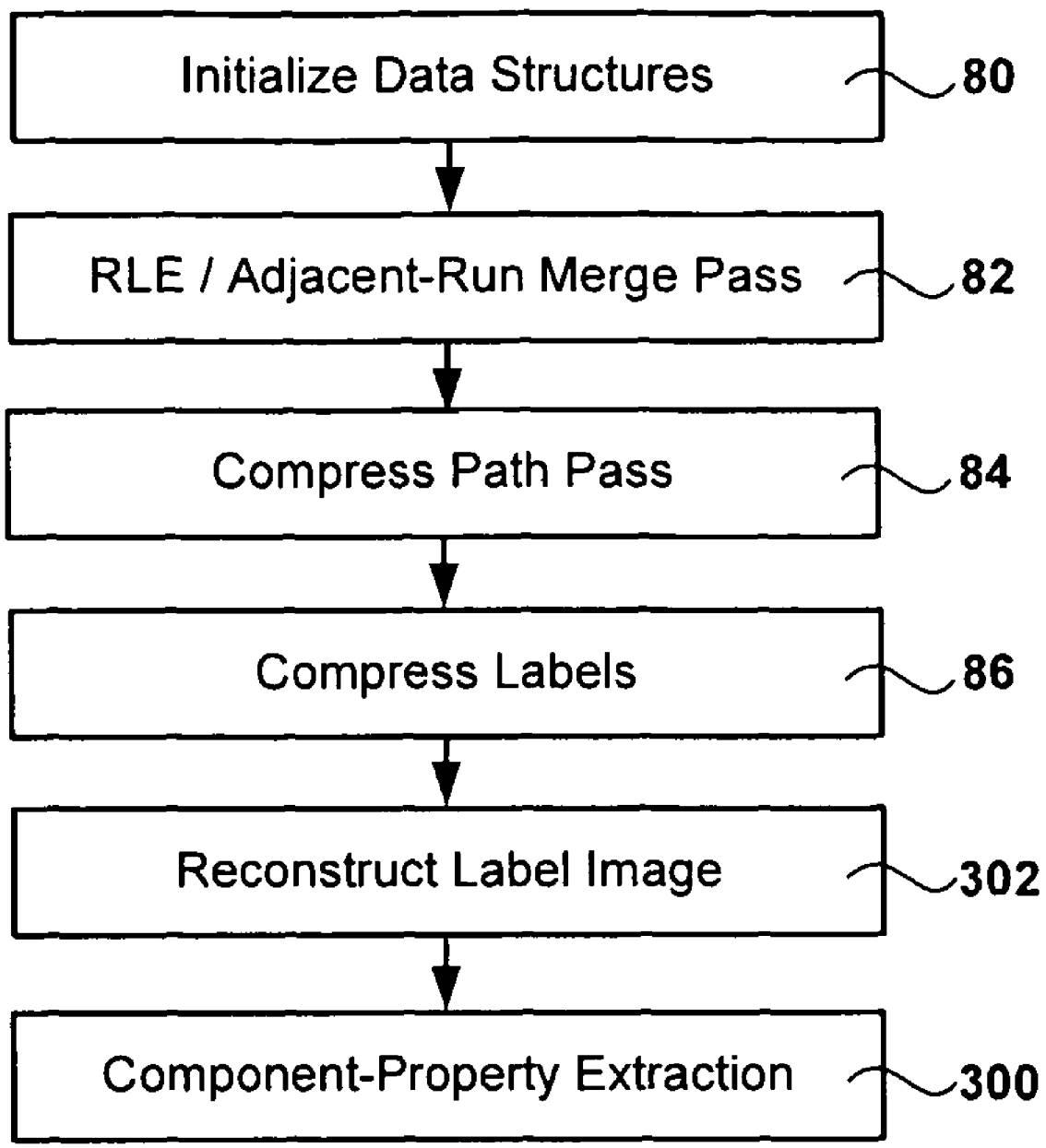
Figure 18:
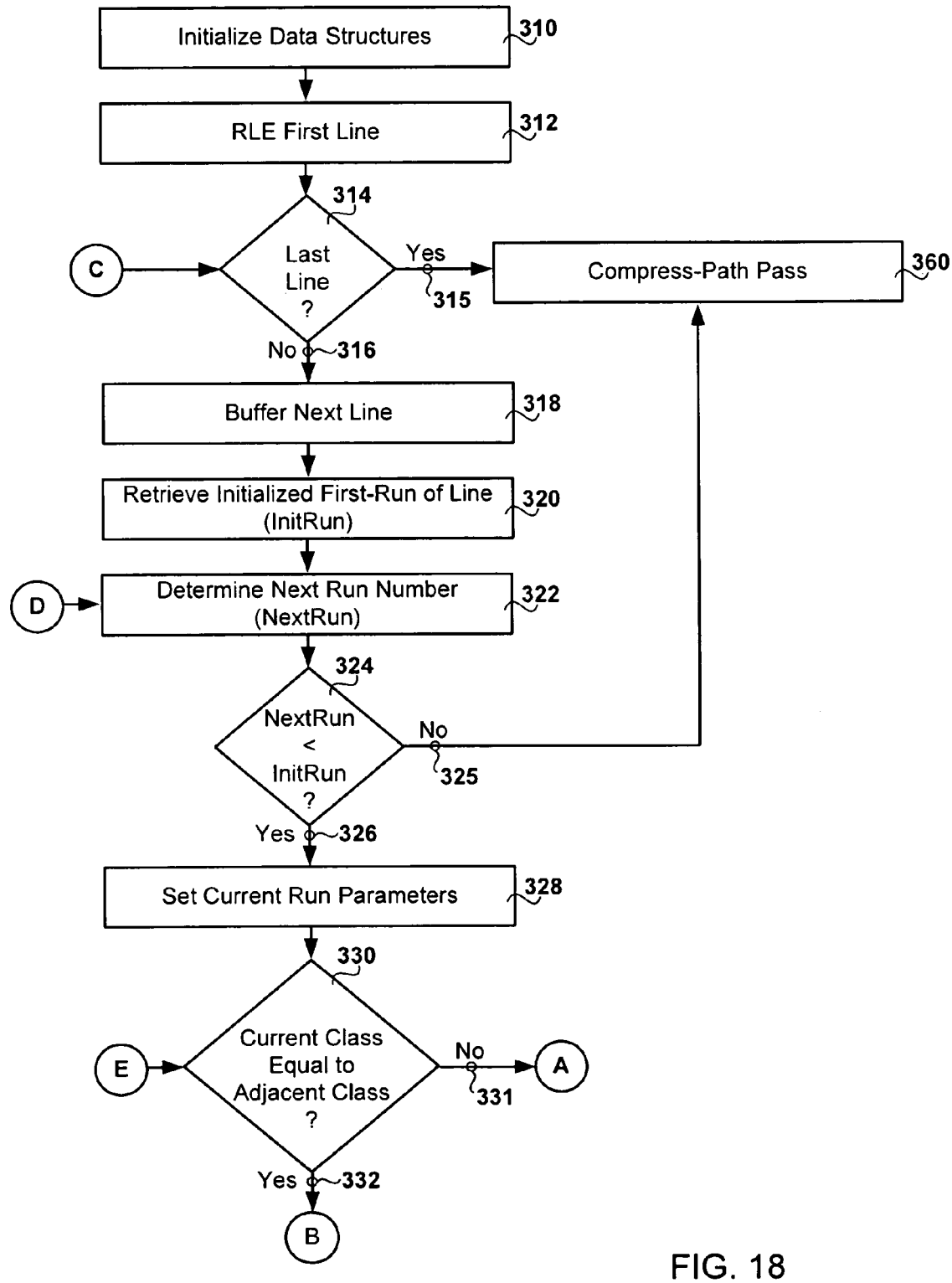
Figure 19:
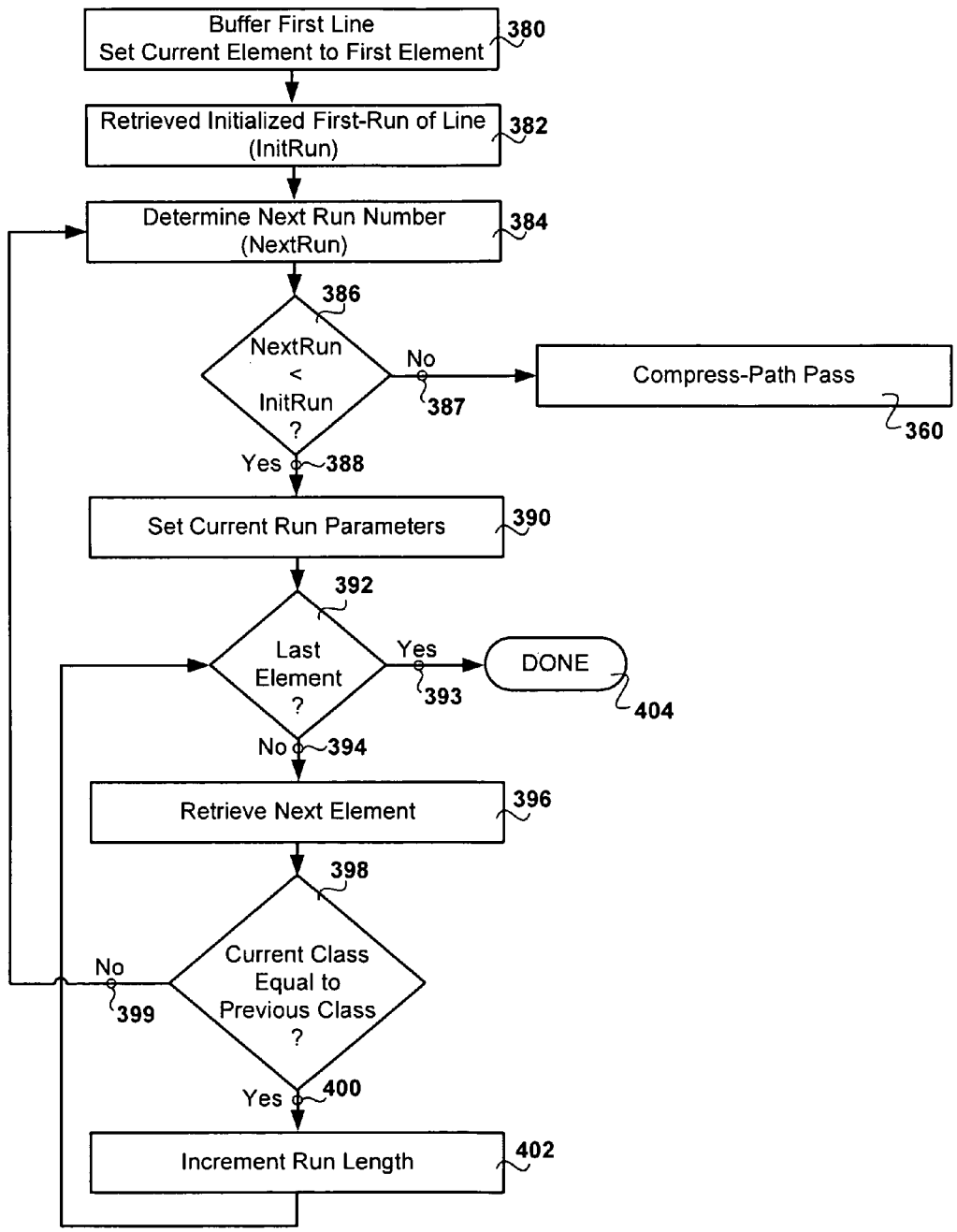
Figure 20:
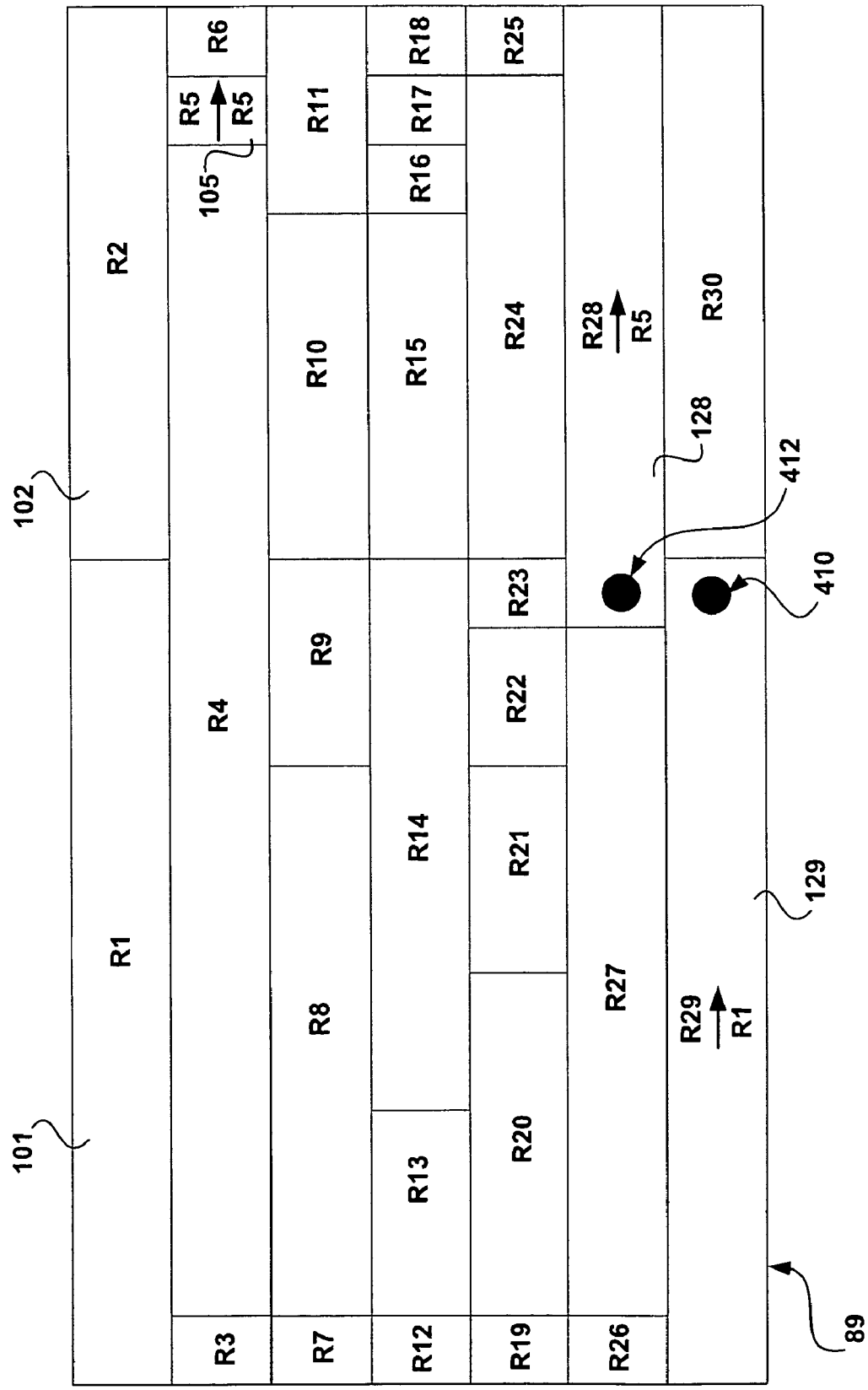
Figure 21:
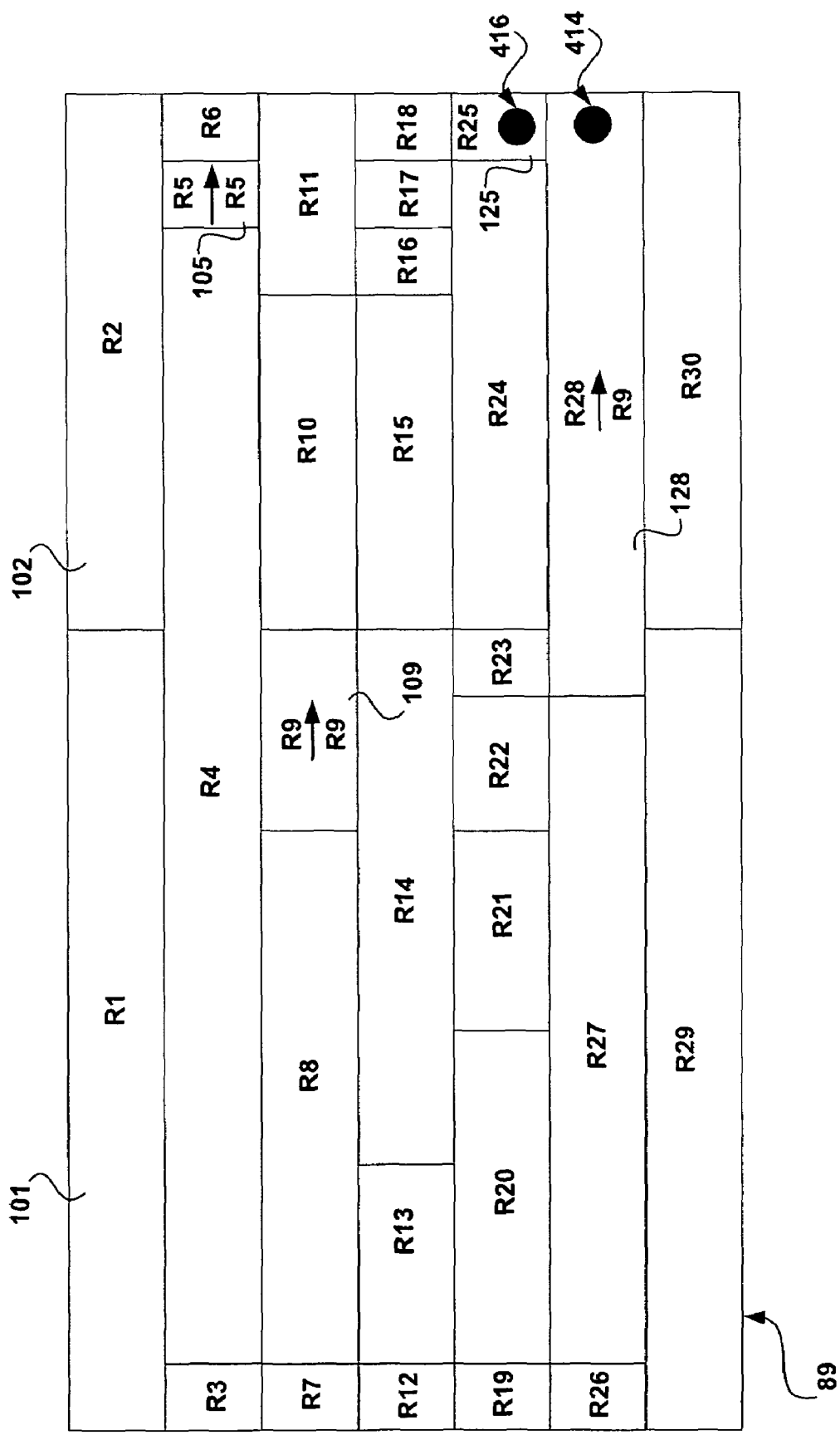

FIG. 8A is a picture depicting a connectivity-graph related to a first class in the exemplary class map shown in FIG. 6; the connectivity-graph illustrates exemplary embodiments of the present invention, in particular, the connectivity-graph illustrates methods and systems according to exemplary embodiments of the present invention when applied to the first line of the exemplary class map illustrated in FIG. 6;

FIG. 8B is a picture depicting a connectivity-graph related to a second class in the exemplary class map shown in FIG. 6; the connectivity-graph illustrates exemplary embodiments of the present invention, in particular, the connectivity-graph illustrates methods and systems according to exemplary embodiments of the present invention when applied to the first line of the exemplary class map illustrated in FIG. 6;

FIG. 9A is a picture depicting a connectivity-graph related to the first class in the exemplary class map shown in FIG. 6; the connectivity-graph illustrates exemplary embodiments of the present invention, in particular, the connectivity-graph illustrates methods and systems according to exemplary embodiments of the present invention when applied to the second line of the exemplary class map illustrated in FIG. 6;

FIG. 9B is a picture depicting a connectivity-graph related to a second class in the exemplary class map shown in FIG. 6; the connectivity-graph illustrates exemplary embodiments of the present invention, in particular, the connectivity-graph illustrates methods and systems according to exemplary embodiments of the present invention when applied to the second line of the exemplary class map illustrated in FIG. 6;

FIG. 10A is a picture depicting a connectivity-graph related to the first class in the exemplary class map shown in FIG. 6; the connectivity-graph illustrates exemplary embodiments of the present invention, in particular, the connectivity-graph illustrates methods and systems according to exemplary embodiments of the present invention when applied to the third line of the exemplary class map illustrated in FIG. 6;

FIG. 10B is a picture depicting a connectivity-graph related to a second class in the exemplary class map shown in FIG. 6; the connectivity-graph illustrates exemplary embodiments of the present invention, in particular, the connectivity-graph illustrates methods and systems according to exemplary embodiments of the present invention when applied to the third line of the exemplary class map illustrated in FIG. 6;

FIG. 11A is a picture depicting a connectivity-graph related to the first class in the exemplary class map shown in FIG. 6; the connectivity-graph illustrates exemplary embodiments of the present invention, in particular, the connectivity-graph illustrates methods and systems according to exemplary embodiments of the present invention when applied to the fourth line of the exemplary class map illustrated in FIG. 6;

FIG. 11B is a picture depicting a connectivity-graph related to a second class in the exemplary class map shown in FIG. 6; the connectivity-graph illustrates exemplary embodiments of the present invention, in particular, the connectivity-graph illustrates methods and systems according to exemplary embodiments of the present invention when applied to the fourth line of the exemplary class map illustrated in FIG. 6;

FIG. 12A is a picture depicting a connectivity-graph related to the first class in the exemplary class map shown in FIG. 6; the connectivity-graph illustrates exemplary embodiments of the present invention, in particular, the connectivity-graph illustrates methods and systems according to exemplary embodiments of the present invention when applied to the fifth line of the exemplary class map illustrated in FIG. 6;

FIG. 12B is a picture depicting a connectivity-graph related to a second class in the exemplary class map shown in FIG. 6; the connectivity-graph illustrates exemplary embodiments of the present invention, in particular, the connectivity-graph illustrates methods and systems according to exemplary embodiments of the present invention when applied to the fifth line of the exemplary class map illustrated in FIG. 6;

FIG. 13A is a picture depicting a connectivity-graph related to the first class in the exemplary class map shown in FIG. 6; the connectivity-graph illustrates exemplary embodiments of the present invention, in particular, the connectivity-graph illustrates methods and systems according to exemplary embodiments of the present invention when applied to the sixth line of the exemplary class map illustrated in FIG. 6;

FIG. 13B is a picture depicting a connectivity-graph related to a second class in the exemplary class map shown in FIG. 6; the connectivity-graph illustrates exemplary embodiments of the present invention, in particular, the connectivity-graph illustrates methods and systems according to exemplary embodiments of the present invention when applied to the sixth line of the exemplary class map illustrated in FIG. 6;

FIG. 14A is a picture depicting a connectivity-graph related to the first class in the exemplary class map shown in FIG. 6; the connectivity-graph illustrates exemplary embodiments of the present invention, in particular, the connectivity-graph illustrates methods and systems according to exemplary embodiments of the present invention when applied to the seventh line of the exemplary class map illustrated in FIG. 6;

FIG. 14B is a picture depicting a connectivity-graph related to a second class in the exemplary class map shown in FIG. 6; the connectivity-graph illustrates exemplary embodiments of the present invention, in particular, the connectivity-graph illustrates methods and systems according to exemplary embodiments of the present invention when applied to the seventh line of the exemplary class map illustrated in FIG. 6;

FIG. 15 is a chart showing exemplary embodiments of the present invention comprising component-property extraction;

FIG. 16 is a chart showing exemplary embodiments of the present invention comprising label reconstruction;

FIG. 17 is a chart showing exemplary embodiments of the present invention comprising label reconstruction and component-property extraction;

FIG. 18 is a chart showing exemplary embodiments of the present invention comprising reservation of a plurality of runs to assure complete encoding of a class map;

FIG. 19 is a chart showing exemplary embodiments of the present invention comprising run-length encoding of the first line in a class map;

FIG. 20 is a picture depicting an exemplary class map and illustrating the updating of parent labels based on adjacent connectivity according to exemplary embodiments of the present invention; and FIG. 21 is a picture depicting an exemplary class map and illustrating the updating of parent labels based on adjacent connectivity according to exemplary embodiments of the present invention.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

In some applications, it may be useful to connect similarly labeled elements into regions based on contiguity. An individual region may then be studied, processed, analyzed or otherwise treated as a connected unit in order to determine region properties, to identify the object class to which the region belongs or to apply a specific process to the region's elements. An exemplary process may comprise the application of a region-specific filter to all the elements in a region.

A process of connecting elements into regions may be referred to as connected-component labeling, and such algorithms may be cited in the image-processing literature as connected-component algorithms. Methods and systems for computing connected regions efficiently may be desirable.

Figure 1:
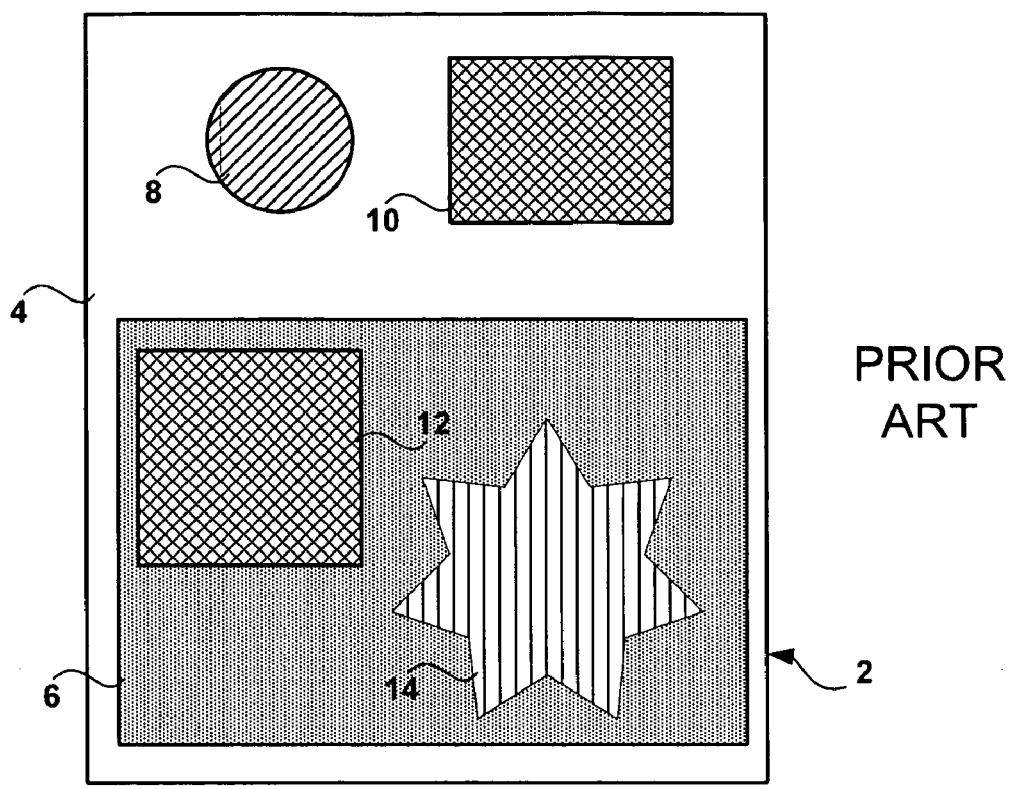
FIG. 1 is a picture depicting an exemplary class map (Prior Art)
Figure 2:
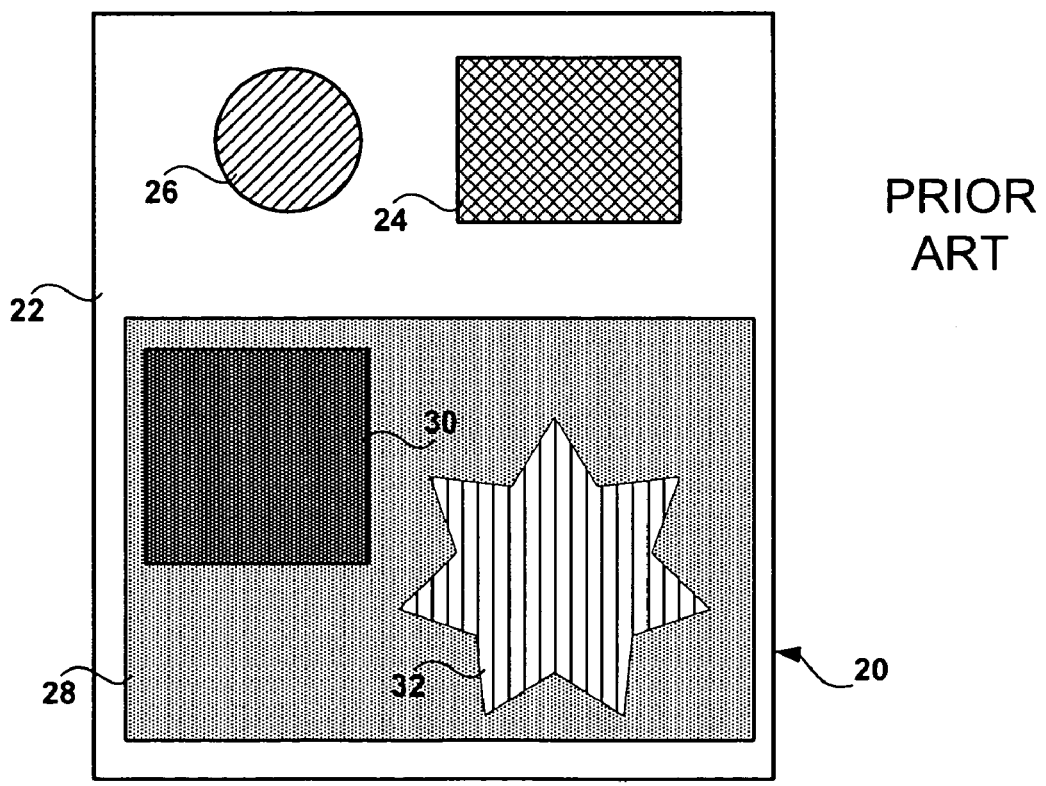
FIG. 2 is a picture depicting exemplary connected-components for the exemplary class map illustrated in FIG. 1 (Prior Art)

The problem of connected-component labeling may be illustrated in relation to FIG. 1 and FIG. 2. FIG. 1 depicts an exemplary class map 2, wherein an element value within the class map 2 indicates the element type, or class to which the element belongs. In FIG. 1, elements with the same element-type value are indicated by like shading. FIG. 1 depicts six regions 4, 6, 8, 10, 12, 14 with elements belonging to five different classes. The elements in the two rectangular-shaped cross-hatched regions 10, 12 consist of elements belonging to the same class. One example of a class map may be the result of a system that classifies an image element as text, picture or halftone. Another example of a class map may be a product of a system that classifies an image element as sky or grass. A person having ordinary skill in the art may appreciate the many types of class maps which may arise in image-processing applications.

A connected-component labeling algorithm may group connected elements with similar labels into components. Each component may be given a unique label so that its elements may be processed together. FIG. 2 depicts an exemplary connect-component labeling 20 for the class map 2 shown in FIG. 1. Each connected component shown in FIG. 2 is indicated by a different shading type. FIG. 2 depicts six connected components 22, 24, 26, 28, 30, 32. The two components 24, 30 corresponding to the two regions 10, 12 in FIG. 1 belonging to the same class are given separate, unique labels in the connected-component labeling 20.

A connected-component algorithm may be optimized for a specific computational architecture. An implementation of a specific connected-component algorithm may determine how best to search and cache the connectivity of the elements that make up each component. The necessity of accounting for complex component topologies and large component areas may make the design of an algorithm that efficiently uncovers the connectivity of the elements complicated.

An iterative connected-component labeling method may grow a region from a seed by iteratively indexing through the class-map data until no additional elements are added to the region, that is, until the region stops growing. This may be computationally expensive since the number of iterations through the data may be equal to the number of elements in a component. However, the memory utilization and access patterns for an iterative approach may be predictable.

A recursive connected-component labeling method may start from an unlabeled element. The method may then recursively examine the element's neighbors and their neighbors, and so on. The recursion may be controlled using a stack construct. Component elements may be pulled off of the stack and then examined. Connected neighbors may be added to the stack. This process may continue until the stack is empty. A recursive approach may require fewer computations that an iterative approach, but may have image-dependent memory utilization and random memory access patterns.

A hybrid connected-component labeling method may be a combination of the two basic approaches, recursive and iterative. A hybrid approach may comprise a simple process with largely predictable memory access patterns. A first process may group components with simple convex topologies into a single region, but components with more complex topologies may be split into multiple sub-components that need to be merged later. To merge split components, a hybrid method may recursively trace the sub-component connectivity. A hybrid method with bounded merge recursion may be desirable.

A hybrid connected-component labeling method may comprise two steps. The first step may comprise building a graph that links each element with adjacent, connected neighbors. The second step may traverse the vertices of the graph to identify connected sub-graphs, wherein each of the connected sub-graphs forms a connected component.

The initial graph may have a vertex for each basic element and links between each neighboring vertex with the same class type. An exemplary basic element is a pixel. This graph data structure may not be the optimal representation, with respect to memory and operations, for connected-component labeling. The process may be simplified by grouping elements with similar values into a single vertex before traversing the graph structure. For images in raster format, pixels along a raster are co-located in memory, and similar pixels connected with a raster line maybe grouped into a single vertex. The grouping may reduce the number of vertices and links in the graph. Additional gains may be realized by reading multiple lines and grouping across lines.

Some connected-component labeling algorithms comprise two steps wherein a class map may be first run-length encoded (RLE) forming an RLE map. Adjacent runs of similar class may be then merged forming a merged RLE map, and region information may be extracted from the merged RLE map. In these algorithms a class map, which designates a unique label for each class in the image, may be first run-length encoded to connect pixels on the same row with the same class label. The runs in the RLE map may be parsed to connect across rows and extract region properties.

Figure 3:
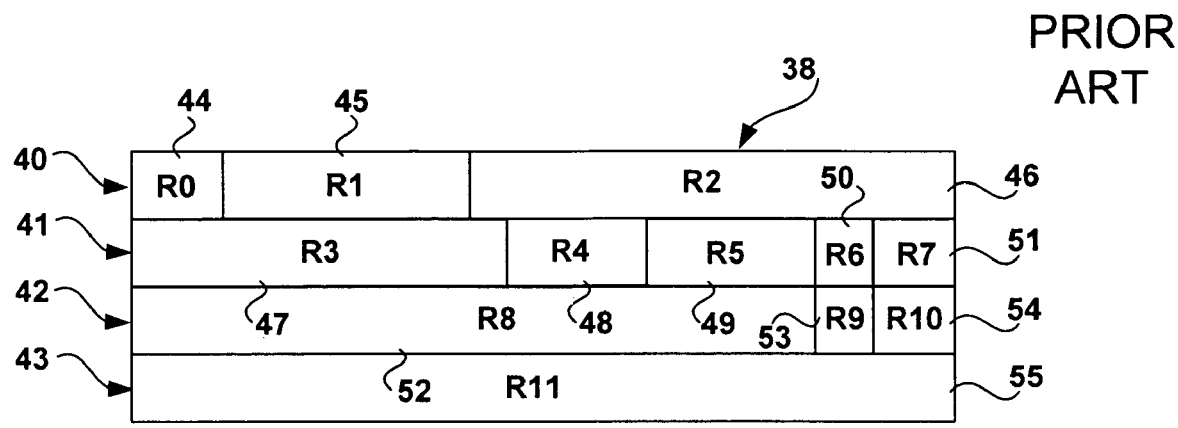
FIG. 3 is a picture depicting an exemplary run-length encoded class map (Prior Art)
Figure 4:
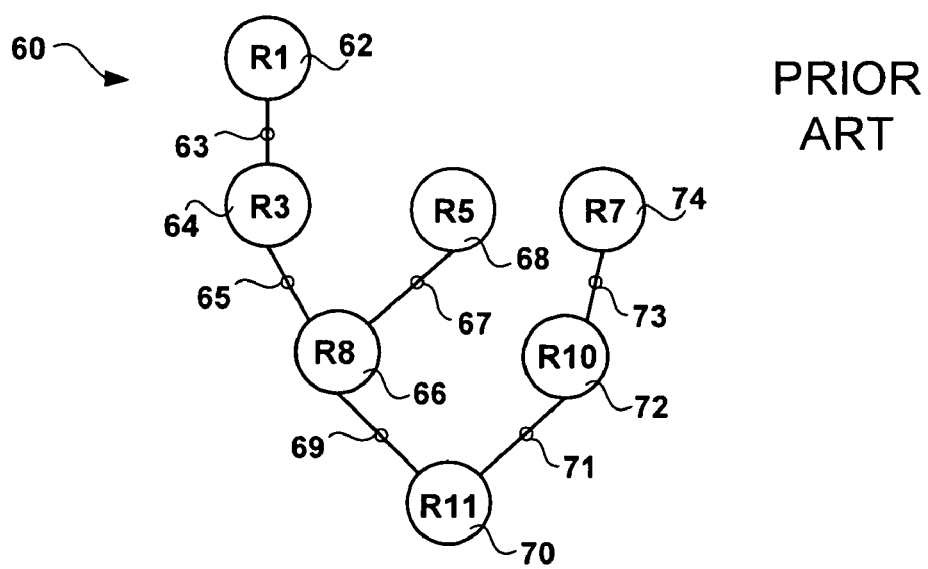
FIG. 4 is a picture depicting an exemplary connectivity-graph for the example class map illustrated in FIG. 3 (Prior Art)

Even in simple topologies the path lengths between vertices may vary considerably from one element to another. This may be illustrated in relation to FIG. 3 and FIG. 4. FIG. 3 illustrates an exemplary class map 38 comprising four lines 40-43 comprising twelve runs 44-55, denoted R0-R11, and two classes, where one class is indicated pictorially by white-colored blocks and the other class is indicated by gray-colored blocks. The connectivity graph 60 for the gray-colored class of this example is depicted in FIG. 4. The connectivity graph 60 illustrates the connection between runs with a vertex for each run 62, 64, 66, 68, 70, 72, 74 and a link 63, 65, 67, 69, 71, 73 depicting adjacency. The data-dependent path lengths may complicate implementation of the algorithm on architectures that require more deterministic memory and computation utilization.

Methods and systems which use fixed-size memory buffers to store data structures for connected-component labeling may be desirable. In addition, methods and systems which have predetermined maximum execution path lengths that do not depend on input data may also be desirable. Embodiments of the present invention relate to methods and systems for connected-component labeling comprising fixed execution path and fixed memory footprint. These methods and systems may be especially suited for Application Specific Integrated Circuit (ASIC) or single-instruction multiple-data-path (SIMD) digital signal processing (DSP) implementations.

Some embodiments of the present invention may comprise a data structure associated with the class-map parameters. The class-map-parameters data structure may store the number of columns and the number of rows in the class map.

Some embodiments of the present invention may comprise a data structure associated with the encoded runs. The run data structure may store the parameters associated with each run. In particular, the run data structure may store a parent label for each run, the class associated with each run and the run length of each run. In some embodiments of the present invention, the run data structure may comprise storage associated with each run up to a predetermined, maximum number of runs, and this data structure may be indexed by a run-number index.

Some embodiments of the present invention may comprise a data structure associated with the starting run of each row in the class map. The starting-run data structure may store a memory reference into the run data structure for each row in the class map. A memory reference associated with a class-map row may reference the run which starts the encoding of the class-map row. In some embodiments of the present invention, the starting-run data structure may comprise storage associated with each row and may be indexed by a row-number index.

Some embodiments of the present invention may comprise an input class map buffer that contains the current scan line being processed. The input class-map buffer may be large enough to accommodate class map data associated with one scan line.

Some embodiments of the present invention may comprise an output connected-component label buffer that contains the connected-component labels for a scan line. The output connected-component label buffer may be large enough to accommodate output labels associated with one scan line.

In some embodiments of the present invention, the data structures may be stored in local buffers which may be close to the arithmetic units.

Some of the parameters in the above-described data structures may be variable from input data to input data. Others may be fixed by the overall system calling the connected-component algorithm. In some embodiments of the present invention, the class-map parameters may be determined by the systems application. In an exemplary application comprising a multi-function peripheral (MFP) device, the scan resolution may be a fixed set of values with an a priori known maximum value. By fixing these parameters at a predetermined maximum value, the worst case requirements for most of the data structures may be known. The remaining parameters may be determined by the number of runs, which depends on the input class-map data.

In some embodiments of the present invention, the amount of on-chip cache or internal buffers may be a fixed resource, and the number of runs may be limited to ensure that the number of encoded runs never exceeds the internal buffer upper resource limit. In some embodiments, the maximum number of runs may be selected to balance system cost against the complexity of input data which may be handled.

In some embodiments of the present invention, a number of runs equal to the number of rows in the input class map may be reserved at the end of the run data structure so that the class map may be minimally encoded once as belonging to a default class. In some embodiments of the present invention, these reserved runs may be overwritten.

Figure 5:
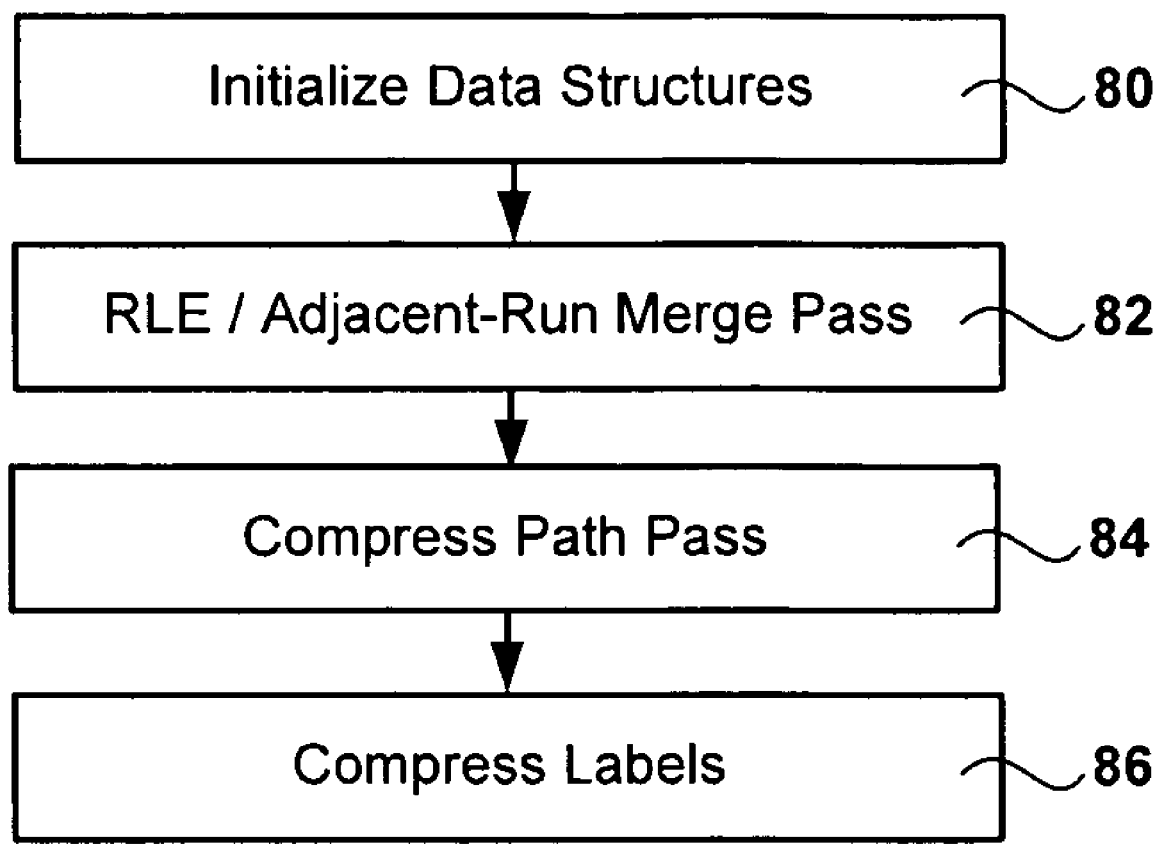
FIG. 5 is a chart showing exemplary embodiments of the present invention comprising a first run-length encoding and adjacent-run merging pass through a class map followed by a second path-compression pass through a run data structure.

Some embodiments of the present invention described in relation to FIG. 5 comprise initialization of the data structures 80. Initialization 80 is followed by a first data pass which combines run-length encoding of the class map and linking of neighboring runs that have similar classes 82. A second data pass 84 compresses the paths identified in the first pass 82 to the upper-most run. The component labels may then be determined 86.

In some embodiments of the present invention, the data structures may be initialized 80 with values that may reconstruct a valid label image even when the number-of-runs limit is exceeded by the RLE process. In these embodiments, the run data structure and the starting-run data structure may be pre-allocated with default values. These initial, default values may be used to reconstruct a valid label image. The following exemplary pseudo-code illustrates the initialization process 80:

```
/* initialize run data structure */
For each run (let rIdx be the run index
        from 0 to NumberRunLimit – Number of Rows –1)
    cRun = rIdx
    Class[rIdx] = default class value
    ParentLabel[rIdx] = cRun
    RunLength[rIdx] = Number of Columns
/* reserve (Number of Rows) runs at the end of the data structure */
For each row (let rIdx be the row index
        from 0 to (Number of Rows) –1)
    cRun = NumberRunLimit – Number of Rows + rIdx
    StartingRun[rIdx] = cRun
    Class[rIdx] = default class value
    ParentLabel[rIdx] = cRun
    RunLength[rIdx] = Number of Columns
``` where StartingRun is the starting-run data structure, Class, ParentLabel and RunLength are the fields of the run data structure, NumberRunLimit is the maximum number of runs allowed, default class value indicates the default class, and Number of Rows and Number of Columns indicate the number of rows and the number of columns in the class map, respectively.

In some embodiments of the present invention in which the input class map indicates whether or not a pixel belongs to the image background, the default class value may be the class value associated with background. In these embodiments, the initialization procedure may ensure that the run data structures have encoded the entire output image as background. When the encoding commences from the class-map buffer, these initial values may be overwritten.

In some embodiments of the present invention, the state of the starting-run data structure and the run data structure immediately after the initialization process may ensure the encoding of the entire output image as the default class value. When the encoding process from the class-map buffer commences, the process may overwrite the initialize values. The method may rewrite data-dependent run values into the starting-run data structure to indicate the first run for each row in the image. The run value may be determined from the RLE portion of the RLE/adjacent-run merge pass 82 through the class-map data. The class, parent label and run length data fields of the run data structure may be rewritten with the values from the RLE/adjacent-run merge pass 82 also. As the data fields are rewritten, the current run value may be checked with the current row's initialized starting-run value. In some embodiments, the current row's initialized starting-run value may be cached when coding of the row commences. If the current run value equals the initialized starting-run value for the row, then the data fields in the run data structure may be modified to encode the remaining portion of the row as the default class, and the encoding of rows may be terminated such that the remaining class-map data does not impact the run data structures. The remaining runs may be unmodified from their initialized state. This check assures that there are a sufficient number of runs left to encode a complete class-map image. The initialization and encoding logic allows the system to encode as much of the class map as possible before defaulting to the default class.

After initialization 80, a combined process 82 run-length encodes the class-map data and links neighboring runs of similar elements together. In an exemplary embodiment of the present invention, the class types may comprise the following element types: text, local background, page background, pictorial art and line art.

In some embodiments, a combined process 82 of run-length encoding and adjacent-run merging may use a single line of class-map data, which may be buffered in an input class-map buffer. The first line of data may be run-length encoded. Once a second line has been received, the combined RLE/adjacent-run merging process 82 may commence. The second line may be run-length encoded, and the new runs may be linked with runs of similar types from previously encoded runs. The process 82 may examine the prior, adjacent, encoded line of data to see if connected runs have similar type and should be encoded with the same component label. Temporary component labels may be stored in the parent-label field for each run in the run data structure. Initially this value may be the same as the run index. As connections between runs are discovered, this field may be updated to contain the run index of the connected run.

In some embodiments of the present invention, the adjacent-run merge portion of the first pass 82 may be based on four-connectivity. In alternative embodiments, the adjacent-run merge portion of the first pass 82 may be based on eight-connectivity.

The following pseudo-code illustrates the RLE/adjacent-run merge pass 82 for four-connectivity:

```
For each line of data
    For each element in a line
        If class of current element equals class of the previous element
        in the line
            increment length of current run
        Else
            If new run index ≧ line's initialized starting run
                stop encoding new runs /* memory limit reached */
            Else
                start a new run
            If passed end of adjacent run /* line above current line */
                update adjacent-run information
            If class of current element equals class of adjacent run
                If current run's parent label less than adjacent run's parent
                label
                    pRef1 = parent label of current run
```

-continued

```
    pRef2 = parent label of run pRef1
    update parent label of the parent of adjacent run with pRef2
    update adjacent run's parent label with pRef2
  Else
    pRef1= parent label of adjacent run
    pRef2 = parent label of run pRef1
    update parent label of the parent of current run with pRef2
    update current run's parent label with pRef2.
```

The following exemplary pseudo-code illustrates the RLE/adjacent-run merge pass 82 for eight-connectivity:

```
For each line of data
  For each element in a line
    If class of current element equals class of the previous element in the line
      increment length of current run
    Else
      If new run index ≧ line's initialized starting run
        stop encoding new runs /* memory limit reached */
      Else
        start a new run
        For each left, upper and right neighboring adjacent run
        update adjacent-neighboring-run information
        If class of current element equals class of adjacent-neighboring-run
          If current run's parent label less than adjacent run's parent label
            pRef1 = parent of current run
            pRef2 = parent of pRef1
            update parent label of the parent of adjacent run with pRef2
            update adjacent run's parent label with pRef2
          Else
            pRef1 = parent of adjacent run
            pRef2 = parent of pRef1
            update the parent label of the parent of current run with pRef2
            update current run's parent label with pRef2.
```

In embodiments of the present invention wherein four-connectivity is the basis for connectivity between runs, it is sufficient, for merging elements, to examine the run, in the prior line, containing the element directly above the current-line element being encoded and merged. In embodiments of the present invention wherein eight-connectivity is the basis for connectivity between runs, the upper diagonal elements also need to be tested. In the worse case three adjacent runs may be tested.

One of ordinary skill in the art will recognize that the exemplary pseudo-code included herein is merely illustrative of some of the embodiments of the present invention, and they will understand that there are many equivalent forms of the pseudo-code.

Figure 7:
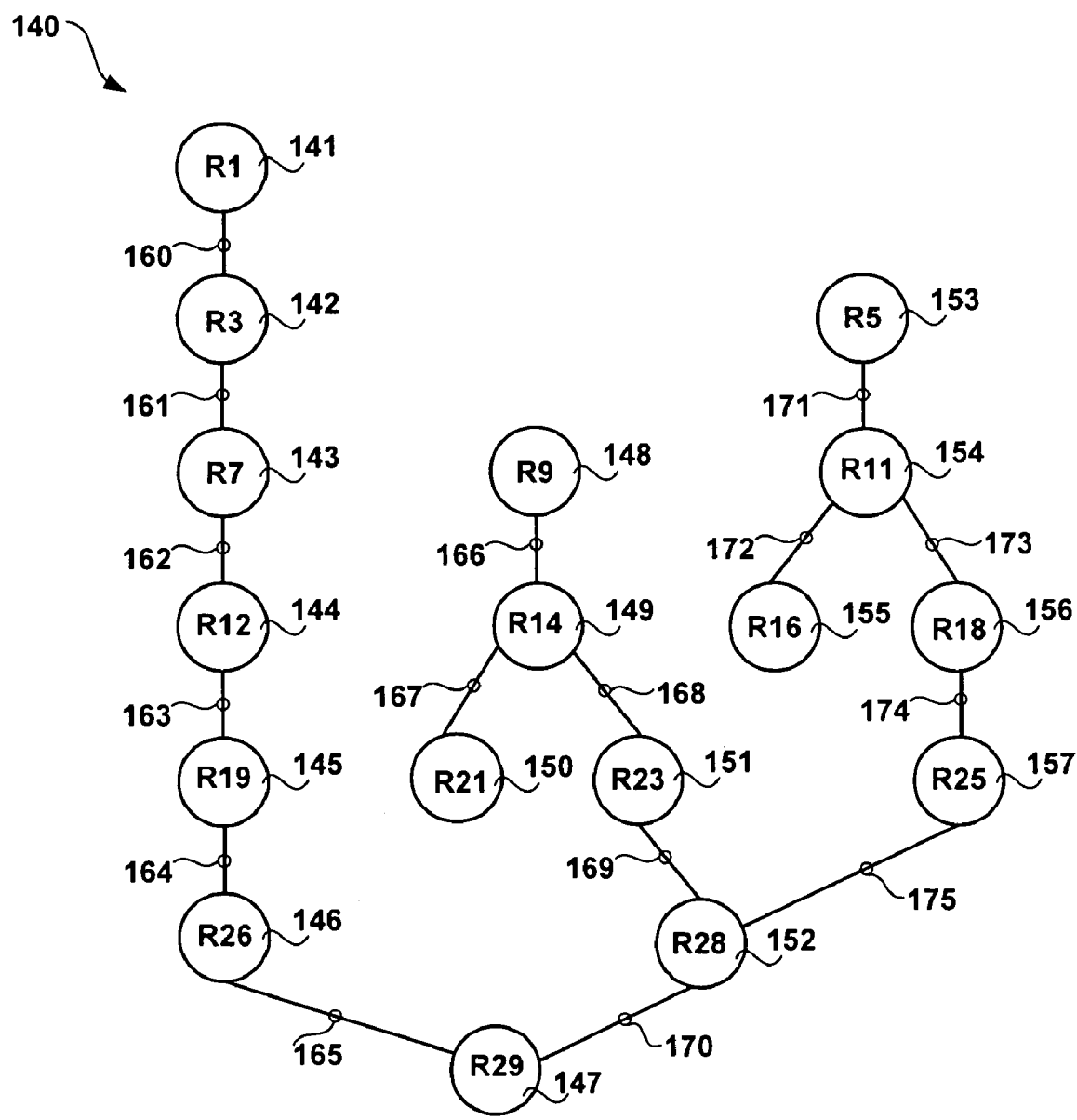
FIG. 7 is a picture depicting an exemplary connectivity-graph for the exemplary class map illustrated in FIG. 6.

The RLE/adjacent-run merge pass 82 of embodiments of the present invention may be further understood in relation to an example as pictured in FIG. 6. FIG. 6 depicts an exemplary class map 89 comprising seven rows 90-96, also considered lines, and two classes indicated by white and gray runs 101-130. FIG. 7 depicts the connectivity graph 140 between the gray runs 101, 103, 105, 107, 109, 111, 112, 114, 116, 118, 119, 121, 123, 125, 126, 128, 129 shown in FIG. 6. Runs are indicated as vertices 141-157 on the connectivity graph 140, and adjacent connected runs are indicated by links 160-175 on the connectivity graph 140. A corresponding connectivity graph may be made for the white runs 102, 104, 106, 108, 110, 113, 115, 117, 120, 122, 124, 127, 130 shown in FIG. 6. A run may be denoted by "R" and a run number for reference in the follow example. Thus, for example, the first run 101 may be referred to as R1, and the twenty-second run 122 may be referred to as R22.

According to some embodiments of the present invention, a first line 90 of a class map 89 may be run-length encoded. After the run-length encoding of the first line 90, two runs 101, 102 are associated with the line 90. The first run 101, R1, is associated with a first class (gray), and the second run 102, R2, is associated with a second class (white). Each run 101, 102 points back to itself as its respective parent run. This is shown pictorially in FIG. 8A and FIG. 8B. In FIG. 8A, the first run 101, R1, is depicted as a vertex 201 in the graph 180 with a link 251 pointing to the vertex 201 representing the parent run 101 associated with the first run 101. In FIG. 8B, the second run 102, R2, is depicted as a vertex 202 in the graph 181 with a link 252 pointing to the vertex 202 representing the parent run 102 associated with the second run 102, R2.

After the first line 90 of the class map 89 is run-length encoded, the second line 91 may be examined element-by-element. The second line 91 may be run-length encoded and run paths may be merged. A third run 103, R3, is identified, and during examination of the elements within R3 103, the adjacent run 101 in the previous line 90 is examined to determine class connectivity. Since the R3 103 is of the same class as the adjacent run, R1 101, the respective parent runs are examined, and R1 101 is determined to be the parent run of R3 103. Similarly, the fourth run 104, R4, is identified and determined to have as its parent run R2 102. The fifth run 105, R5, is identified, and the since all runs from the previous line 90 which are adjacent to R5 105 are of a different class than R5 105, the parent of R5 105 is set to itself 105. The sixth run 106, R6, is identified and determined to have as its parent run R2 102. FIG. 9A and FIG. 9B depict the runs identified after processing the second line 91. The graph 182 shown in FIG. 9A illustrates R3 103 with a vertex 203 and a pointer 253, or link, to the vertex 201 representing its parent run, the first run 101, R1. The fifth run 105, R5, is represented with a vertex 205 and a link 255 to itself indicating its parent run 105. Correspondingly, the graph 183 shown in FIG. 9B illustrates vertices 204, 206 corresponding to R4 104 and R6 106, respectively. The links 254, 256 indicating the parent runs for these runs are shown pointing to the vertex 202 representing R2 102.

After the second line 91 of the class map 89 is run-length encoded, the elements of the third line 92 may be examined, and the third line 92 may be run-length encoded and run paths may be merged. A seventh run 107, R7, may be identified, and since the adjacent run 103, R3, belongs to the same class, the parent runs may be examined to determine which is furthest up the connectivity tree. In some embodiments of the present invention, the run that is furthest up the connectivity tree may be determined by determining which parent run has the lowest run number. In this example, the parent of R7 107 is the adjacent run, R3 103, and since the parent run 101 of R3 103 is higher up the connectivity tree, the parent run of R7 107 is determined to be the first run 101, R1. The eighth 108 and tenth 110 runs, R8 108 and R10 110, respectively, are identified and R2 102 is determined to be the parent, in each case. The ninth run 109, R9, is its own parent, while the parent of R11 111 is the fifth run 105, R5. The graphs 184, 185 shown in FIG. 10A and in FIG. 10B depict the runs identified after the processing of the third line 92. As in the figures described above, a vertex 201-211 corresponds to a run 101-111 with the link 251-261 pointing to the vertex associated with the parent run.

FIG. 11A and FIG. 11B illustrate the resultant graphs 186, 187, respectively, after processing the fourth line 93. The vertices 201-218 in the graphs 186, 187 correspond to runs 101-118, and the links 251-268 associate runs with parent runs.

FIG. 12A and FIG. 12B illustrate the resultant graphs 188, 189, respectively, after processing the fifth line 94. The vertices 201-225 in the graphics 188, 189 correspond to runs 101-125, and the links 251-275 associate runs with parent runs. It may be particularly illustrative to consider R24 124. Initially, the elements in this run 124 are adjacent to R15 115, and the parent run is R2 102. When an element in R24 124 is processed wherein the element is adjacent to elements in R17 117, the parent of the current element is less than the parent of the adjacent element, and subsequently, the parent of R17 117 gets updated to the parent of the current run, that is, R2 102. Thus at the end of the processing of the fifth line 94, the parent of the R17 117 has been updated to the second run 102, R2.

FIG. 13A and FIG. 13B illustrate the resultant graphs 190, 191, respectively, after processing the sixth line 95. The vertices 201-228 correspond to runs 101-128, and the links 251-278 associating runs with parent runs. When the first-encountered elements in the twenty-eighth run 128, R28, are processed, the parent of R28 will be set to R9 109 by virtue of the connectivity to the ninth run 109. However, as the latter-encountered elements in R28 128 are processed, the parent of R28 128 will be updated to the R5 105, as will the parent of the ninth run 109.

FIG. 14A and FIG. 14B illustrate the resultant graphs 192, 193, respectively, after processing the seventh line 96. The vertices 201-230 correspond to runs 101-130, and the links 251-280 associate runs with parent runs. When the twenty-ninth run 129, R29, is processed, its parent run will become the first run 101, R1. Thus when the latter elements in the R29 129 are processed, the parent of R29 129, which is R28 128 will be updated to R1 101 as will the parent of the fifth run 105, since R5 105 was the parent of a run which is currently being updated.

Table 1 shows the result of the RLE/adjacent-run merge pass 82.

In some embodiments of the present invention, after the first pass 82 through the class map, a compress-path pass 84 may be made through the run data structure. In this pass 84, the paths are compressed to the upper-most run. This following exemplary pseudo-code illustrates the compress-path pass 84:

```
For each run in run data structure
    pRef1 = parent of current run
    pRef2 = parent of pRef1
    update current run's parent to pRef2.
```

Table 2 shows the result of the compress-path pass 84.

In some embodiments of the present invention, after the compress-path pass 84, a component's parent label may be correlated with the component's upper-most run index. This may require more storage than necessary. For many class maps, the number of unique parent labels may be significantly less than the number of possible runs. Some embodiments of the present invention may comprise generation of a connected-component label image, and the upper-most run-index value may not be the most efficient labeling. To reduce the required bit depth, the run parent-label fields may be examined to determine the number of components, and the run fields may be re-labeled 86 to hold sequential component label values, instead of run indices. In some embodiments of the present invention, the re-labeling 86 may be done using a hash table. In the example described above, an exemplary component re-labeling 86 may be that the component with parent R1 may be labeled component 0, the component with parent R2 may be labeled component 1, and the component with parent R30 may be labeled component 2.

Some embodiments of the present invention described in relation to FIG. 15 may comprise region-property extraction 300 after label compression 86. Region-property, also considered component-property, extraction 300 may use run-length data structures to efficiently calculate various component properties. Exemplary properties comprise region area, component bounding box, component center of mass, component-bounding-box center and other component or region properties. The following exemplary pseudo-code indexes the run-length data structures to determine exemplary region properties:

```
initialize region properties /* component area, bounding box parameters */
For each line of data
    retrieve starting run for line
    While not at end of line of data
        retrieve component label for current run
        add run's length to component area
        update component's max, min spatial extent /* bounding box */
        increment to next run
For each component
    determine bounding box center.
```

Some embodiments of the present invention described in relation to FIG. 16 may comprise reconstruction 302 of a label image. The following exemplary pseudo-code illustrates reconstruction 302 of a label image from the run-length data structures:

```
For each line of data
    retrieve starting run for line
    While not at end of line of data
        retrieve component label for current run
        retrieve length for current run /* RunLength */
        write component label into label image for RunLength elements
        increment to next run.
```

Some embodiments of the present invention described in relation to FIG. 17 may comprise reconstruction 302 of a label image and extraction 300 of component properties. In some embodiments of the present invention, these two processes may be performed serially, reconstruction 302 followed by extraction 300. In alternative embodiments, extraction 300 may be performed first and may be followed by reconstruction 302. In still alternative embodiments, extraction 300 and reconstruction 302 may be performed in parallel.

Some embodiments of the present invention described in relation to FIG. 18 may comprise initialization 310 of data structures. In some embodiments of the present invention, the data structures may be initialized 310, wherein a sufficient number of runs may be reserved to encode the remainder of a class map as a default class.

In some embodiments of the present invention, a run data structure may comprise a data structure with sufficient memory to store for each run, of a maximum number of runs, a plurality of run parameters. The run parameters may comprise a memory reference to a parent run, a run length and a class associated with the run. In some embodiments of the present invention, the memory reference to the parent run may comprise the run index in the data structure of the parent run. In some embodiments of the present invention, initialization 310 of the run data structure may comprise initializing, for each run, the memory reference to the parent run to the index of the run, the run length to the number of columns in the class map being processed and the class associated with each run to a default class.

In some embodiments of the present invention, a starting-run data structure may comprise a data structure with sufficient memory to store for each row of an input class map a memory reference to the first run in the row. In some embodiments of the present invention, initialization 310 of the starting-run data structure may comprise pointing the starting run of each row to a corresponding run in a reserved portion of the run data structure. In some embodiments of the present invention, the last M runs of the run data structure may be the reserved portion, wherein M is the number of rows in the class map.

After initialization 310 of the data structures, the first row in the class map may be run-length encoded 312. The run-length encoding 312 may comprise setting the memory reference in the starting-run data structure to point to the first run in the run data structure. The run-length encoding 312 may be further understood in relation to FIG. 19. The first line of the class map may be buffered and the current element may be set the first element in the line 380. The initialized first-run, InitRun, of the first line may be retrieved and cached 382, and the next run number, NextRun, may be determined 384. The initialized first-run and the next run may be compared 386 to determine if the encoding should terminate 387 and the compress-path pass should commence 360. The encoding may terminate 387 when there are only a number of runs left sufficient to encode each remaining line of the class map as the default class. If the encoding should not terminate 388, then the current-run parameters may be set 390. The parent label may be referenced to the current run, the class may be set to the class of the current element and the run length may be reset to zero.

It may then be determined 392 if the current element is the last element in the first line. If so 393, then the run-length encoding of the first line may terminate 404. If not 394, then the next element may be retrieved 396. The class of the next element may be compared 398 to the class of the current run. If the classes are the same 400, then the length of the current run may be incremented 402, and it may be determined 392 if the last element of the row has been processed. If the classes are not the same 399, then the next run number may be determined 384, and the process may continue.

After the first line of the class map is run-length encoded 312, a check may be made 314 to determine if the last line of the class map has been processed. If so 315, then RLE/merge-run pass may be terminated, and the compress-path pass may commence 360. If the last line has not 316 been processed, then the next line of the class map may be buffered 318. The initialized first-run, InitRun, corresponding to the line may be retrieved 320 and cached. The next run, NextRun, may be determined 322. The initialized first-run and the next run may be compared 324 to determine if the encoding should terminate 325 and the compress-path pass should commence 360. The encoding may terminate 325 when there are only a number of runs left sufficient to encode each remaining line of the class map as the default class. If the encoding should not terminate 326, then the current-run parameters may be set 328. The parent label may be referenced to the current run, the class may be set to the class of the current element and the run length may be reset to zero.

The class of the current element may be compared 330 to the class of an adjacent element in the previously encoded row. Some embodiments of the present invention may comprise a four-connectivity criterion in which the only adjacent element which may be check is that directly above the current element. Alternative embodiments of the present invention may comprise an eight-connectivity criterion in which the diagonally-adjacent elements in the previous line may also be checked.

If there are no connected adjacent elements 331, then a check may be performed 334 to determine if there are additional elements in the current line. If there are additional elements 336, then the next element may be retrieved 338, and the class of the retrieved element may be compared 340 to that of the now-previous element. If the classes are the same 342, then the run length may be incremented 344, and the comparison against the class of an adjacent element 330 may be performed. If the class are not the same 341, then a new run may be started 322.

If there are connected adjacent elements 332, then the parent of the current element may be compared to that of the adjacent, connected element 346. If the parent of the current element is further up the connectivity tree than that of the adjacent element 348, then the parent of the parent of the adjacent element may be updated 350 to reference the parent of the current element. Additionally, the parent label of the adjacent element may be updated 352 to reference the parent of the current element.

This may be illustrated in relation to the exemplary class map 89 shown in FIG. 6 which is shown again in FIG. 20. When the element 410 at the end of R29 129 is examined, it is determined that the current element 410 is adjacent to an element 412 in R28 128. The parent run of the current element 410 is R1 101, and the parent run of the adjacent element 412 is R5 105. Thus, the parent run 101 of the current element 410 is further up the connectivity tree than that 105 of the adjacent element 412. Therefore, the parent of the adjacent run's parent, R5 105, will be set to R1 101, as will the parent of the adjacent run R28 128. The notation shown in FIG. 21:

indicates the parent run for the identified run. Thus, after the processing of the current element 410, the following may be updated as indicated by:

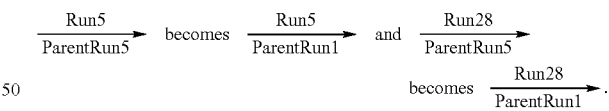

If the parent of the adjacent element is further up the connectivity tree than that of the current element 347, then the parent of the parent of the current element may be updated 351 to reference the parent of the adjacent element. Additionally, the parent label of the current element may be updated 353 to reference the parent of the adjacent element.

This may be illustrated in relation to the exemplary class map 89 shown in FIG. 6 which is shown again in FIG. 21. When the element 414 at the end of R28 128 is examined, it is determined that the current element 414 is adjacent to an element 416 in R25 125. The parent run of the current element 414 is R9 109, and the parent run of the adjacent element 416 is R5 105. Thus, the parent run 105 of the adjacent element 416 is further up the connectivity tree than that 109 of the current element 414. Therefore, the parent of the current run's parent, R9 109, will be set to R5 105, as will the parent of the current run R28 128. Thus, after the processing of the current element 414, the following may be updated as indicated by:

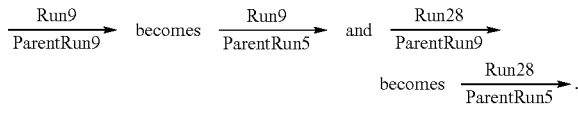

The above-described examples are intended for illustration and not limitation.

TABLE 1

Results of RLE/adjacent-run merge pass for exemplary class map

| RUN INDEX | LABEL of PARENT RUN | CLASS |
|---|---|---|
| 1 | 1 | gray |
| 2 | 2 | white |
| 3 | 1 | gray |
| 4 | 2 | white |
| 5 | 1 | gray |
| 6 | 2 | white |
| 7 | 1 | gray |
| 8 | 2 | white |
| 9 | 5 | gray |
| 10 | 2 | white |
| 11 | 5 | gray |
| 12 | 1 | gray |
| 13 | 2 | white |
| 14 | 9 | gray |
| 15 | 2 | white |
| 16 | 5 | gray |
| 17 | 2 | white |
| 18 | 5 | gray |
| 19 | 1 | gray |
| 20 | 2 | white |
| 21 | 9 | gray |
| 22 | 2 | white |
| 23 | 9 | gray |
| 24 | 2 | white |
| 25 | 5 | gray |
| 26 | 1 | gray |
| 27 | 2 | white |
| 28 | 1 | gray |
| 29 | 1 | gray |
| 30 | 30 | white |

TABLE 2

Results of compress-path pass for exemplary run data structure

| RUN INDEX | LABEL of PARENT RUN after RLE/ merge pass | LABEL of PARENT RUN after RLE/ merge pass | CLASS |
|---|---|---|---|
| 1 | 1 | 1 | gray |
| 2 | 2 | 2 | white |
| 3 | 1 | 1 | gray |
| 4 | 2 | 2 | white |
| 5 | 1 | 1 | gray |
| 6 | 2 | 2 | white |
| 7 | 1 | 1 | gray |
| 8 | 2 | 2 | white |
| 9 | 5 | (parent of 5 is) 1 | gray |
| 10 | 2 | 2 | white |
| 11 | 5 | (parent of 5 is) 1 | gray |
| 12 | 1 | 1 | gray |
| 13 | 2 | 2 | white |
| 14 | 9 | (parent of 9 is) 1 | gray |
| 15 | 2 | 2 | white |
| 16 | 5 | (parent of 5 is) 1 | gray |
| 17 | 2 | 2 | white |
| 18 | 5 | (parent of 5 is) 1 | gray |
| 19 | 1 | 1 | gray |
| 20 | 2 | 2 | white |
| 21 | 9 | (parent of 9 is) 1 | gray |
| 22 | 2 | 2 | white |
| 23 | 9 | (parent of 9 is) 1 | gray |
| 24 | 2 | 2 | white |
| 25 | 5 | (parent of 5 is) 1 | gray |
| 26 | 1 | 1 | gray |
| 27 | 2 | 2 | white |
| 28 | 1 | 1 | gray |
| 29 | 1 | 1 | gray |
| 30 | 30 | 30 | white |

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for identifying a connected component, said method comprising:
   a) receiving a class map;
   b) run-length encoding a first line in said class map;
   c) receiving a first element in a second line in said class map, wherein said second line is adjacent to said first line and wherein a first class value is associated with said first element;
   d) identifying a second element in said first line, wherein said second element is adjacent to said first element according to an adjacency criterion and wherein a second class value is associated with said second element; and
   e) when said first class value is equal to said second class value, performing the following:
      i) receiving a first parent reference, said first parent reference associated with said first element;
      ii) receiving a second parent reference, said second parent reference associated with said second element;
      iii) comparing said first parent reference and said second parent reference;
      iv) when said comparing meets a first criterion, performing the following:
         (1) receiving a third parent reference, said third parent reference associated with said first parent reference;
         (2) updating said first parent reference to said second parent reference; and
         (3) updating said third parent reference to said second parent reference; and
      v) when said comparing does not meet said first criterion, performing the following:
         (1) receiving a fourth parent reference, said fourth parent reference associated with said second parent reference;
         (2) updating said second parent reference to said first parent reference; and
         (3) updating said fourth parent reference to said first parent reference.

2. A method as described in claim 1, wherein said adjacency criterion is one selected from the group consisting of four-connectivity and eight-connectivity.

3. A method as described in claim 1, wherein said class map comprises:
   a) a first class associated with a default class of image elements; and
   b) a second class associated with another class of image elements.

4. A method as described in claim 3, wherein said default class of image elements is associated with image background.

5. A method as described in claim 1 further comprising initializing a plurality of data structures.

6. A method as described in claim 5, wherein said initializing comprises reserving a first plurality of runs equal in number to the number of rows in said class map.

7. A method as described in claim 6, wherein said reserving comprises associating an initialized starting run in a starting-run data structure with a corresponding run in said first plurality of runs.

8. A method as described in claim 6, wherein said reserving comprises associating with each run in said first plurality of runs a default element class.

9. A method as described in claim 8, wherein said default element class is associated with image background elements.

10. A method as described in claim 1, wherein:
    a) said class map comprises a plurality of elements;
    b) wherein each element in said plurality of elements is associated with one of a plurality of runs;
    c) wherein each run in said plurality of runs is associated with a parent run;
    d) wherein said method comprises a first data structure associated with said plurality of runs and associated parent runs; and
    e) wherein said method comprises a compress-path pass through said first data structure.

11. A method as described in claim 1 further comprising:
    a) when said first class value is not equal to said second class value and said first element is not the last element on said second line, performing the following:
       i) receiving a third element, wherein said third element is the next element immediately following said first element in said second line and wherein a third class value is associated with said third element;
       ii) comparing said third class value with said first class value;
       iii) when said third class value is equal to said first class value, incrementing a run-length indicator associated with a first run associated with said first element; and
       iv) when said third class value is not equal to said first class value, performing the following:
          (1) determining a next-run indicator;
          (2) comparing said next-run indicator with an initialized run indicator associated with said second line; and
          (3) when said next-run indicator is greater than or equal to said initialized run indicator associated with said second line, terminating a first encoding process.

12. A method for identifying a connected component, said method comprising:
    a) receiving a class map;
    b) receiving a first element, wherein said first element is an element in a first row of said class map and wherein a first class value is associated with said first element;
    c) comparing said first class value with a current-run class value associated with a current run;
    d) when said first class value is not equal to said current-run class value, performing the following:
       i) determining a next-run value;
       ii) receiving an initialized run value associated with said first row;
       iii) comparing said next-run value and said initialized run value; and
       iv) when said next-run value and said initialized run value meet a first criterion, terminating a first encoding process.

13. A method as described in claim 12 further comprising initializing a plurality of data structures.

14. A method as described in claim 13, wherein said initializing comprises associating an initialized starting run in a starting-run data structure with a corresponding run in said first plurality of runs.

15. A method as described in claim 13, wherein said initializing comprises reserving a first plurality of runs equal in number to the number of rows in said class map.

16. A method as described in claim 15, wherein said reserving comprises associating with each run in said first plurality of runs a default element class.

17. A method as described in claim 16, wherein said default element class is associated with image background elements.

18. A method as described in claim 12, wherein said class map comprises:
    a) a first class associated with a default class of image elements; and
    b) a second class associated with another class of image elements.

19. A method as described in claim 18, wherein said default class of image elements is associated with image background.

20. A system for identifying a connected component, said system comprising:
    a) a class-map receiver for receiving a class map;
    b) a run data structure for storing a plurality of values associated with a plurality of runs;
    c) a first-run data structure for storing a plurality of references into said run data structure, wherein each reference in said plurality of references associates a line in said class map with an initial run from said plurality of runs;
    d) a run data structure initializer for initializing said run data structure, wherein said initializing said run data structure comprises reserving, from said plurality of runs, a first plurality of runs equal in number to the number of rows in said class map; and
    e) a first-run data structure initializer for initializing said first-run data structure, wherein said initializing said first-run data structure comprises associating an initialized starting run in said starting-run data structure with a corresponding run in said first plurality of runs.

21. A system as described in claim 20 further comprising associating a default class with each run in said first plurality of runs during said initializing said run data structure.

22. A system as described in claim 21, wherein said default class is associated with background elements in an image associated with said class map.

23. A system as described in claim 20 further comprising a run-length encoder for run-length encoding a first line in said class map.

* * * * *